United States Patent
Wang et al.

(10) Patent No.: US 11,463,874 B2
(45) Date of Patent: Oct. 4, 2022

(54) USER PROFILE, POLICY, AND PMIP KEY DISTRIBUTION IN A WIRELESS COMMUNICATION NETWORK

(71) Applicant: QUALCOMM Incorporated, San Diego, CA (US)

(72) Inventors: Jun Wang, Poway, CA (US); Arungundram Mahendran, San Diego, CA (US); Vidya Narayanan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 16/179,760

(22) Filed: Nov. 2, 2018

(65) Prior Publication Data
US 2019/0075462 A1 Mar. 7, 2019

Related U.S. Application Data

(62) Division of application No. 12/048,883, filed on Mar. 14, 2008, now Pat. No. 10,171,998.
(Continued)

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0407* (2013.01); *H04L 63/06* (2013.01);
(Continued)

(58) Field of Classification Search
CPC ..... H04L 63/0407; H04L 63/06; H04L 63/08; H04L 63/083; H04L 63/0853;
(Continued)

(56) References Cited

U.S. PATENT DOCUMENTS 6,445,922 B1   9/2002   Hiller et al.
6,563,919 B1   5/2003   Aravamudhan et al.
(Continued)

FOREIGN PATENT DOCUMENTS

CN   1501746 A   6/2004
CN   1816081 A   8/2006
(Continued)

OTHER PUBLICATIONS

Aboba, et al., "The Network Access Identifier," Nokia, Dec. 2005, sec. 2.3, sec. 2.7-2.8, and sec. 3.
(Continued)

*Primary Examiner* — Theodore C Parsons
(74) *Attorney, Agent, or Firm* — Sunstein LLP

(57) ABSTRACT

An authentication server may be adapted to (a) authenticate an authentication peer seeking to establish communications via a first network access node; (b) retrieve user profile information associated with the authentication peer; and/or (c) send the user profile information to a network gateway node that facilitates communication services for the authentication peer. A PMIP network node may be adapted to (a) provide wireless network connectivity to an authentication peer via a first network access node; (b) provide a PMIP key to both ends of a PMIP tunnel between the first network access node and a PMIP network node used to provide communications to the authentication peer; (c) provide the PMIP key to a first authenticator associated the first network access node; (d) receive a request at the PMIP network node from a requesting entity to reroute communications for the authentication peer; and/or (e) verify whether the requesting entity knows the PMIP key.

24 Claims, 16 Drawing Sheets

Related U.S. Application Data

(60) Provisional application No. 60/895,298, filed on Mar. 16, 2007.

(51) Int. Cl.
*H04W 80/04* (2009.01)
*H04W 12/75* (2021.01)
*H04W 12/02* (2009.01)

(52) U.S. Cl.
CPC ............ *H04L 63/08* (2013.01); *H04L 63/083* (2013.01); *H04L 63/0853* (2013.01); *H04L 63/0892* (2013.01); *H04L 63/102* (2013.01); *H04L 63/162* (2013.01); *H04L 63/205* (2013.01); *H04W 12/02* (2013.01); *H04L 63/20* (2013.01); *H04W 12/75* (2021.01); *H04W 80/04* (2013.01)

(58) Field of Classification Search
CPC ............ H04L 63/0876; H04L 63/0892; H04L 63/102; H04L 63/162; H04L 63/20; H04L 63/205; H04W 12/02; H04W 12/06; H04W 12/069; H04W 12/75; H04W 80/04
See application file for complete search history.

(56) References Cited

U.S. PATENT DOCUMENTS

| | | |
|---|---|---|
| 7,107,620 B2 | 9/2006 | Haverinen et al. |
| 7,505,432 B2 | 3/2009 | Leung et al. |
| 7,539,156 B2 | 5/2009 | Leung et al. |
| 7,636,569 B2 | 12/2009 | Le et al. |
| 7,793,098 B2 | 9/2010 | Perkins et al. |
| 8,478,266 B1 | 7/2013 | Zhou et al. |
| 8,630,414 B2 | 1/2014 | Hsu |
| 2003/0176188 A1 | 9/2003 | O'Neill |
| 2004/0193891 A1 | 9/2004 | Ollila |
| 2005/0041650 A1 | 2/2005 | O'Neill |
| 2005/0102529 A1 | 5/2005 | Buddhikot et al. |
| 2005/0169249 A1 | 8/2005 | Shirota et al. |
| 2006/0019635 A1 | 1/2006 | Ollila et al. |
| 2007/0066286 A1* | 3/2007 | Hurtta .................. H04W 92/06 455/414.1 |
| 2007/0260739 A1 | 11/2007 | Buckley et al. |
| 2008/0108321 A1 | 5/2008 | Taaghol et al. |
| 2008/0192695 A1 | 8/2008 | Krishnan et al. |
| 2008/0263631 A1 | 10/2008 | Wang et al. |
| 2009/0313466 A1 | 12/2009 | Naslund et al. |
| 2010/0046434 A1 | 2/2010 | Weniger et al. |
| 2013/0210391 A1 | 8/2013 | Zhou et al. |

FOREIGN PATENT DOCUMENTS

| | | |
|---|---|---|
| CN | 1852385 A | 10/2006 |
| GB | 2417856 A | 3/2006 |
| WO | 0235797 A2 | 5/2002 |
| WO | 02082730 A1 | 10/2002 |
| WO | 2006050758 A1 | 5/2006 |
| WO | 2006108907 A2 | 10/2006 |
| WO | 2007024357 A3 | 6/2007 |

OTHER PUBLICATIONS

European Search Report—EP18167818—Search Authority—The Hague—dated Jul. 16, 2018.
International Search Report—PCT/US08/057280, International Search Authority—European Patent Office—dated Feb. 9, 2009.
Nakhjiri, et al., Motorola Labs: "EAP based Proxy Mobile IP key bootstrapping: A WIMAX applicability example; draft-nakhjiri-pmip-key-02.txt", IETF Standard-Working-Draft, Internet Engineering Task Force, IETF, CH, No. 2, Feb. 1, 2006 (Feb. 1, 2006), XP015044436, ISSN: 0000-0004, abstract.
NEC Corporation, "Mobile Backhaul Evolution," Feb. 2007, p. 1, col. 2, par. 3 and on p. 2, col. 1, par. 1.
Perkins et al., "Mobile IPv4 Challenge/Response Extensions (revised)," Network Working Group, Jan. 2007, pp. 5-6, 11-13.
Taiwan Search Report—TW102106324—TIPO—dated Feb. 11, 2015.
Written Opinion—PCT/US08/057280, International Search Authority—European Patent Office—dated Feb. 9, 2009.

\* cited by examiner

USER PROFILE, POLICY, AND PMIP KEY DISTRIBUTION IN A WIRELESS COMMUNICATION NETWORK

CLAIM OF PRIORITY UNDER 35 U.S.C. § 119

This application is a divisional application of U.S. patent application Ser. No. 12/048,883, entitled "User Profile, Policy, and PMIP Key Distribution in a Wireless Communication Network," filed Mar. 14, 2008, which claims the benefit of U.S. Provisional Application No. 60/895,298 entitled "3GPP2 Network Evolution: User Profile Policy, and PMIP Key" filed Mar. 16, 2007, both assigned to the assignee hereof. The contents of U.S. patent application Ser. No. 12/048,883 and U.S. Provisional Application No. 60/895,298 are hereby expressly incorporated by reference herein in their entirety for all purposes.

FIELD

At least one feature relates to communication systems, and, more particularly, to a method for facilitating the secure distribution of mobile device information within a wireless network, such as an ultra mobile broadband (UMB) network.

BACKGROUND

In the evolution of various wireless communication networks within 3GPP2, one type of network architecture is known as an ultra mobile broadband (UMB) network and is intended to improve the CDMA2000 mobile phone standard for next generation applications and requirements. UMB packet data networks are based upon Internet (TCP/IP) networking technologies running over a next generation radio system and is intended to be more efficient and capable of providing more services than the technologies it replaces. UMB is intended to be a fourth-generation (4G) technology and uses a high bandwidth, low latency, underlying TCP/IP network with high level services such as voice built on top. The much greater amount of bandwidth (in comparison to previous generations), and much lower latencies, enable the use of various application types that have previously been impossible, while continuing to deliver high quality (or higher quality) voice services.

UBM networks have a less centralized management of its network access nodes, known as evolved base stations (eBS). For instance, such access nodes may perform many of the same functions as the base station (BS) and base station controller (BSC) in a CDMA network. Due to this more distributive network architecture, several problems occur in trying to maintain an access terminal's (AT) network access identifier (NAI) secure.

Under some prior art network architectures, the NAI (or its equivalent access terminal identifier) is transmitted by the access terminal over the air to the packet data serving node (PDSN) which uses it for authentication, accounting report, and/or policy retrieval functions. By transmitting the NAI over the air, it makes it susceptible to snooping and insecure.

In an UMB network, the NAI is not sent over the air. Instead, depending on the extendible authentication protocol (EAP) methods, an access terminal's NAI may not be known to the authenticator. This may be referred to as anonymous NAI. However, a problem occurs in how to authenticate an AT while implementing anonymous NAI.

In a UMB network, the User Profile, and quality of service (QoS) User Profile is sent to the session reference network controller (SRNC) from the local and home authentication, authorization, and accounting (LAAA/HAAA) via successful access authentication. However, User Profile also needs to be sent to an access gateway (AGW) (e.g., via IP services authorization). Thus, a problem exists in how to send the User Profile to an AGW while implementing anonymous NAI.

If a PMIPv4 tunnel is used between an eBS and AGW within a UMB network, the MN-HA key (e.g., can be per AT based key or per eBS-AGW pair key) needs to be sent to both eBS and AGW. Therefore, a problem occurs in how to send the MN-HA key used for PMIPv4 tunnel between the eBS and AGW to the SRNC and AGW.

Consequently, a way is needed to address these issues when implementing anonymous NAI within a UMB network.

SUMMARY

A method operational in an authentication server for a wireless communication network is provided for securing a primary user key. An access authentication request is received from a wireless authentication peer. A secondary user identifier is generated, wherein the secondary user key is associated with a primary user identifier for the wireless authentication peer. The secondary user identifier is the provided to an authenticator associated with the authentication peer. User profile information may be retrieved based on the primary user identifier. The user profile information may be sent to the authenticator.

The communication network may include at least one of a Ultra Mobile Broadband (UMB) compatible network, WiMAX compatible network, or a Long Term Evolution (LTE) compatible network. The authentication server may be an authentication, authorization, and accounting entity (AAA), and the authentication peer is a wireless access terminal (AT). The authenticator may be a session reference network controller (SRNC) associated with a base station (BS) serving the wireless access terminal (AT) in an Ultra Mobile Broadband (UMB) compatible network, and the primary user identifier is a network access identifier (NAI) for the wireless access terminal. The serving base station may be collocated with the session reference network controller (SRNC).

The secondary user identifier may be a randomly generated number that is subsequently associated with the primary user identifier. The secondary user identifier may also be the primary user identifier. The secondary user identifier may be a function of the primary user identifier.

An authentication server is provided including a processing circuit adapted to: (a) receive an access authentication request from a wireless authentication peer; (b) generate a secondary user identifier associated with a primary user identifier for the wireless authentication peer; (c) provide the secondary user identifier to an authenticator associated with the authentication peer; (d) retrieve user profile information based on the primary user identifier; (e) provide the user profile information to the authenticator.

The authentication server may further comprise a communication interface adapted to communicate over at least one of a Ultra Mobile Broadband (UMB) compatible network, WiMAX compatible network, or a Long Term Evolution (LTE) compatible network. The authentication server may be an authentication, authorization, and accounting entity (AAA), and the authentication peer is a wireless access terminal (AT). The authenticator may be a session reference network controller (SRNC) associated with a base station (BS) serving the wireless access terminal (AT) in an Ultra Mobile Broadband (UMB) compatible network, and the primary user identifier is a network access identifier (NAI) for the wireless access terminal. The secondary user identifier may be (a) a randomly generated number that is subsequently associated with the primary user identifier, (b) the primary user identifier, and/or (c) a function of the primary user identifier.

Consequently, an authentication server is also provided comprising: (a) means for receiving an access authentication request from a wireless authentication peer; (b) means for generating a secondary user identifier associated with a primary user identifier for the wireless authentication peer; (c) means for providing the secondary user identifier to an authenticator associated with the authentication peer; (d) means for retrieving user profile information based on the primary user identifier; and/or (e) means for providing the user profile information to the authenticator.

A computer program operational on an authentication server for securing a primary user identifier is also provided, which when executed by a processor causes the processor to: (a) receive an access authentication request from a wireless authentication peer; (b) generate a secondary user identifier associated with a primary user identifier for the wireless authentication peer; (c) provide the secondary user identifier to an authenticator associated with the authentication peer; (d) retrieve user profile information based on the primary user identifier; and/or (e) provide the user profile information to the authenticator.

A method is also provided by an authentication server for distributing user profile and/or policy information within a communication network. An authentication peer seeking to establish communications via a first network access node is authenticated. User profile information associated with the authentication peer is retrieved and sent to a network gateway node that facilitates communication services for the authentication peer. The user profile information is also sent to an authenticator that facilitates communications for the authentication peer. The authentication server may be an authentication, authorization, and accounting (AAA) entity that is part of the communication network.

In one example, sending the user profile information to the network gateway node may include having an authenticator for the communication network send the user profile information to the network gateway node. In another example, sending the user profile information to the network gateway node includes having the authentication server send the user profile information to the network gateway node. The user profile information may include at least one of a user profile, user policy, quality of service for the user profile, for communication services of the authentication peer.

Additionally, the method may further comprising: (a) sending a policy request from the network gateway node to a policy control and resource function (PCRF) entity; (b) sending a primary user identifier request from the PCRF entity to the authentication server, wherein the primary user identifier is uniquely associated with the authentication peer; (c) sending a reply from the authentication server to the PCRF entity including the requested primary user identifier; (d) obtaining a user policy at the PCRF entity for the authentication peer using the primary user identifier; and/or (e) sending the user policy from the PCRF entity to the network gateway node.

The authenticator may be a session reference network controller (SRNC) associated with a base station serving the authentication peer in an Ultra Mobile Broadband (UMB) compatible network, and the confidential identifier is a network access identifier for the wireless access terminal.

An authentication server is also provided including a processing circuit adapted to: (a) authenticate an authentication peer seeking to establish communications via a first network access node; (b) retrieve user profile information associated with the authentication peer; (c) send the user profile information to a network gateway node that facilitates communication services for the authentication peer; (d) send the user profile information to an authenticator that facilitates communications for the authentication peer; (e) receive a primary user identifier request from a PCRF entity, wherein the primary user identifier is uniquely associated with the authentication peer; and/or (0 send a reply to the PCRF entity including the requested the primary user identifier.

Consequently, an authentication server is provided comprising: (a) means for authenticating an authentication peer seeking to establish communications via a first network access node; (b) means for retrieving user profile information associated with the authentication peer; (c) means for sending the user profile information to a network gateway node that facilitates communication services for the authentication peer; (d) means for sending the user profile information to an authenticator that facilitates communications for the authentication peer; (e) means for receiving a primary user identifier request from a PCRF entity, wherein the primary user identifier is uniquely associated with the authentication peer; and/or (f) means for sending a reply to the PCRF entity including the requested the primary user identifier.

A computer program operational on an authentication server is also provided for providing user information, which when executed by a processor causes the processor to: (a) authenticate an authentication peer seeking to establish communications via a first network access node; (b) retrieve user profile information associated with the authentication peer; (c) send the user profile information to a network gateway node that facilitates communication services for the authentication peer; (d) send the user profile information to an authenticator that facilitates communications for the authentication peer; (e) receive a primary user identifier request from a PCRF entity, wherein the primary user identifier is uniquely associated with the authentication peer; and/or (0 send a reply to the PCRF entity including the requested the primary user identifier.

A method operational in a communication network is provided. Wireless network connectivity is provided to an authentication peer via a first network access node. A PMIP key is provided to both ends of a PMIP tunnel between the first network access node and a PMIP network node used to provide communications to the authentication peer. The PMIP key is then provided to a first authenticator associated the first network access node. Communications may be routed to the first network access node.

Subsequently, a request may be received at the PMIP network node from a requesting entity to reroute communications for the authentication peer. The PMIP network node may verify whether the requesting entity knows the PMIP key. In one example, communications may be rerouted to a second network access node if the requesting entity successfully proves that it knows the PMIP key. In another example, communications may be rerouted to a second network gateway node if the requesting entity successfully proves that it knows the PMIP key. Rerouting communications may include establishing a new proxy mobile IP tunnel between the first PMIP network node and a new serving network entity. In one example, the PMIP key may be generated at an authentication, authorization, and accounting (AAA) entity or a network gateway node. The PMIP network node may be a network gateway node.

A PMIP network node is also provided including a processing circuit adapted to: (a) provide wireless network connectivity to an authentication peer via a first network access node; (b) provide a PMIP key to both ends of a PMIP tunnel between the first network access node and the PMIP network node used to provide communications to the authentication peer; (c) provide the PMIP key to a first authenticator associated the first network access node; (d) receive a request from a requesting entity to reroute communications for the authentication peer; (e) verify whether the requesting entity knows the PMIP key; (0 reroute communications to a second network access node if the requesting entity successfully proves that it knows the PMIP key; and/or (g) reroute communications to a second network gateway node if the requesting entity successfully proves that it knows the PMIP key. Rerouting communications may include establishing a new proxy mobile IP tunnel between the first PMIP network node and a new serving network entity.

Consequently, a PMIP network node is also provided, comprising: (a) means for providing wireless network connectivity to an authentication peer via a first network access node; (b) means for providing a PMIP key to both ends of a PMIP tunnel between the first network access node and the PMIP network node used to provide communications to the authentication peer; (c) means for providing the PMIP key to a first authenticator associated the first network access node; receive a request from a requesting entity to reroute communications for the authentication peer; (d) means for verifying whether a requesting entity knows the PMIP key; (e) means for rerouting communications to a second network access node if the requesting entity successfully proves that it knows the PMIP key; and/or (f) means for rerouting communications to a second network gateway node if the requesting entity successfully proves that it knows the PMIP key. Rerouting communications may include establishing a new proxy mobile IP tunnel between the first PMIP network node and a new serving network entity.

A computer program operational on a PMIP network node is also provided, which when executed by a processor causes the processor to: (a) provide wireless network connectivity to an authentication peer via a first network access node; (b) provide a PMIP key to both ends of a PMIP tunnel between the first network access node and the PMIP network node used to provide communications to the authentication peer; (c) provide the PMIP key to a first authenticator associated the first network access node; (d) receive a request from a requesting entity to reroute communications for the authentication peer; (e) verify whether the requesting entity knows the PMIP key; (f) reroute communications to a second network access node if the requesting entity successfully proves that it knows the PMIP key; and/or (g) reroute communications to a second network gateway node if the requesting entity successfully proves that it knows the PMIP key.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
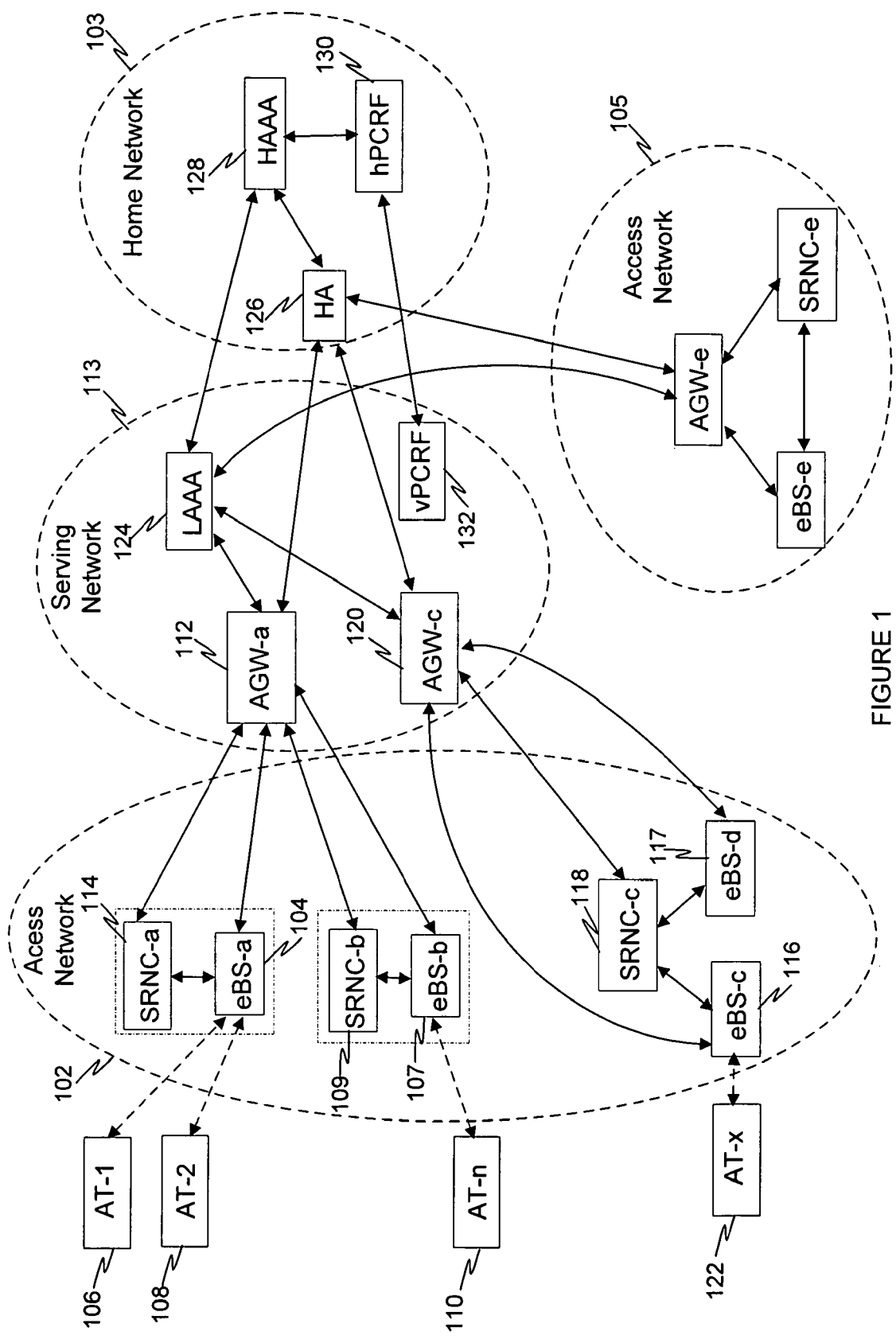
FIG. 1 is a block diagram of a UMB network in which one or more features of secure NAI, secure user profile and policy distribution, and/or PMIP key distribution may be implemented according to one example.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the following description, certain terminology is used to describe certain features. The terms "access terminal" and "communication device" may be interchangeably used to refer to a mobile device, mobile phone, wireless terminal, and/or other types of mobile or fixed communication apparatus capable of communicating over a wireless network.

Network Environment

The features described herein may be implemented in various types of networks, including UMB, WiMAX, and LTE compatible networks.

Figure 14:
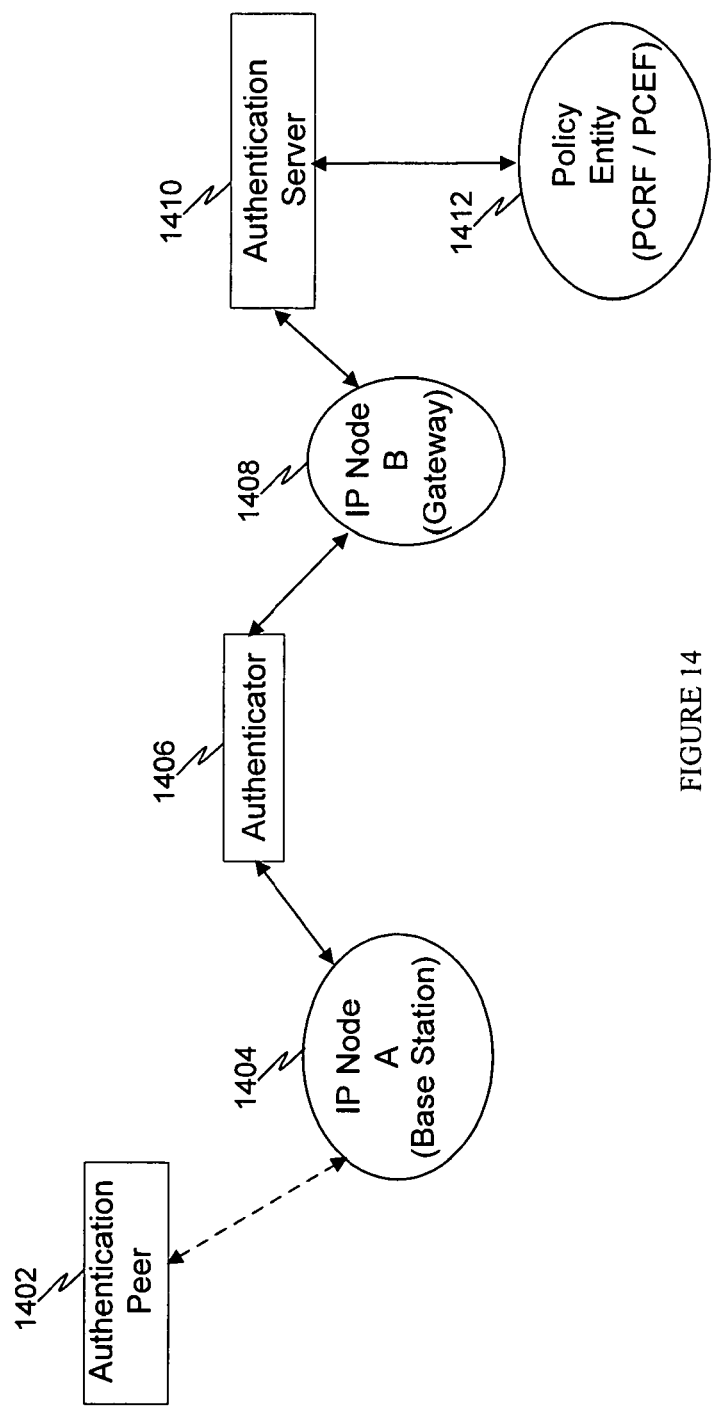
FIG. 14 illustrates an authentication architecture found m some communication networks.

FIG. 14 illustrates an authentication architecture found m some communication networks. The communication network 1400 (e.g., a UMB, WiMAX, or Long Term Evolution (LTE) networks) may include a plurality of IP Nodes 1404 and 1408 with an Authentication Peer 1402, an Authenticator 1406, and an Authentication Server 1410. During operation, the Authentication Peer 1402 (e.g., access terminal) may be authenticated by the Authenticator 1406 with the assistance of the Authentication Server 1410. In one example, the Authenticator 1406 may be a session reference network controller (SRNC) and the Authentication Server 1410 may be a home authentication, authorization, and accounting (HAAA) entity. Additionally, IP Nodes 1404 and 1408 may include a base station, a gateway, and/or other network entities. A Policy Entity 1412 (e.g., PCRF) may store policy information for the Authentication Peer 1402.

In providing communication services to an Authentication Peer 1402 in the communication network 1400, a mechanism or method is needed to distribute a user profile for the Authentication Peer 1402 to both the Authenticator 1406 and IP Node B (Gateway). This is particularly the case since the Authenticator 1406 is not collocated with the IP Node B (Gateway) 1408.

Additionally, when a pseudo-NAI is used to identify the Authentication Peer 1402 to the communication network, it makes it difficult distribute the user policy from a policy entity (e.g., home PCRF) to the IP Nodes 1404 and 1408.

Additionally, it is also problematic to generate and distribute a PMIP key between two IP Nodes that need to setup a PMIP tunnel. For example, in a UMB network, a PMIP key may be distributed to a base station and gateway or a gateway and a local mobility anchor (LMA).

While various examples herein may be illustrated from the point of view of a UMB network, the features described herein may be applicable to other types of networks, such a WiMAX and LTE for example.

FIG. 1 is a block diagram of a UMB network in which one or more features of secure NAI, user profile and policy distribution, and/or PMIP key distribution may be implemented according to one example. A UMB network may use a flat architecture that does not rely on a centralized entity, such as a Base Station Controller (BSC), to coordinate connections across the UMB's evolved base station (eBS). An eBS may combine the functions of a traditional base station, a BSC, and some functions of the packet-data serving node (PDSN) into a single node, making the deployment of the UMB network simpler. As the number of components are reduced (in comparison to prior art networks), the UMB network may be more reliable, more flexible, easier to deploy and/or less costly to operate. For example, in legacy networks, the BS, BSC, PDSN and mobile IP home agent (HA) all cooperate to serve user traffic. UMB networks reuse most of the core network infrastructure but consolidate functions in fewer network components. Combining these functions into fewer nodes reduces latency, decreases capital and maintenance costs, and reduces the complexity of interactions between the nodes to deliver end-to-end QoS.

This example illustrates how a UMB access network 102 and serving network 113 may provide wireless network access to a plurality of access terminals AT 106, 108, 110, 122 (e.g., Authentication Peers) while reusing a core network infrastructure (e.g., Home Network 103). The serving network 113 may be the "home" network for ATs 106, 108, 110, 122 but the ATs may also roam or visit other networks and obtain wireless network connectivity from such other networks.

In this example, the UMB access network 102 includes a first eBS 104 and a second eBS 107 (broadly referred to as "network access nodes") that allow one or more access terminals (AT) 106, 108, and 110 to connect with the serving network 113 and home network 103. The first eBS 104 may be coupled to a first session reference network controller (SRNC) 114 (broadly referred to as "authenticator") and a first access gateway (AGW) 112 (broadly referred to as "network gateway node") in the serving network 113 which couples to the home network infrastructure 103. Similarly, the second eBS 107 may be coupled to a second SRNC 109 and the first AGW 112. The serving network 113 may include the AGW-a 112 and AGW-b 120 that are coupled to the local authentication, authorization, and accounting (LAAA) 124 and a visiting policy control and resource function (vPCRF) 132 to facilitate communications and/or connectivity for the eBSs and ATs. The home network 103 may include a home agent (HA) 126, a home AAA (HAAA) 128, and a home PCRF (hPCRF) 130. Additionally, other access networks 105 may also be coupled to the HA 126 and/or LAAA 124 to provide wireless network connectivity to access terminals.

In various implementations, the UMB access network 102 may include other eBSs 116 and 117, SRNCs 118, and AGWs 120 that may provide wireless network connectivity to other ATs 122. The networks 102, 113, 105, and/or 103 are intended as an example of a communication system in which one or more novel features described herein may operate. However, the devices and/or the functionality of those devices in these networks may be located in of the other networks shown (or a different network) without departing from the operation and features described herein.

According to various examples, the ATs 106, 108, 110, and/or 122 may be wireless communication devices, mobile phones, wireless terminals, and other types of mobile and/or wireless devices that support wireless radio connectivity via a UMB network.

The eBSs 104, 107, and 116 supports the UMB air interface. The eBSs 104, 107 and/or 116, may include UMB physical and/or MAC protocols and may perform radio resource management, radio channel management, layer 2 ciphering, and/or IP header compression (e.g., ROHC).

The AGWs 112 and/or 120 may provide Layer 3 IP connectivity to the home network 103. The AGW 112 and/or 120 may include various functions such as authentication, idle state buffering, and/or proxy mobile IP client. For instance, the AGW 112 and/or 120 may include IP Address Management, Foreign Agent (FA) for MIPv4, DHCP Relay, Proxy mobile IP (PMIP) client, IP packet classification/ policing, EAP authenticator, and/or AAA client.

The SRNCs 114, 109 and 118 may control various functions in support of radio resource control, including session information storage, paging functions, and location management. The SRNC functions may include, for example, (a) air interface session information storage, (b) paging controller, (c) location management, and/or (d) EAP authenticator for ATs. The first SRNC 114 may maintain radio-access-specific information for the ATs 106 and 108, while the second SRNC 107 may maintain radio-access-specific information for the AT 110. A SRNC may be responsible for maintaining the session reference (e.g., session storage point for nego-tiated air-interface context), supporting idle-state management, and providing paging-control functions when the AT is idle. The SRNC may also be responsible for access authentication of the AT. The SRNC function may be hosted by, or collocated with, an eBS or may be located in a separate (radio-less) entity. Note that the SRNC may be implemented both in a centralized or distributed configuration. In a centralized configuration, a single SRNC 118 is connected with several eBSs 116 and 117 and AGW 120. In a distributed configuration, each eBS includes an SRNC.

The authentication, authorization, and accounting (AAA) services for the home network 103 may be divided between a home agent 126, a local AAA (LAAA) 124 and a home AAA (HAAA) 128. The HAAA 128 may be responsible for the authentication, authorization, and accounting associated with the AT's 106, 108, 110 and/or 112 use of the network resources. A home agent (HA) 126 may provide a mobility solution that supports, for example, Client Mobile IP (CMIP) and/or Proxy Mobile IP (PMIP) and may also facilitate inter-technology mobility.

A policy control and resource function (PCRF) may store and distribute policies for the ATs 106, 108, 110, and/or 122. In one implementation, a home PCRF (hPCRF) 130 may be responsible for home network policies and a visiting PCRF (vPCRF) 132 may be responsible for visiting network policies. The hPCRF 130 and vPCRF 132 provide local and visiting rules, respectively, to the AGWs 112 and 120. These rules may include, for example, (a) detection of packets belonging to a service data flow, (b) providing policy control for a service data flow, and/or (c) providing applicable charging parameters for a service data flow.

Securing Anonymous Network Access Identifier

Under prior art networks, such as high rate packet data (HRPD) networks, the access terminals ATs send their network access identifier (NAI)s over the air during an authentication process. Such over-the-air transmission may expose the NAI to third parties and compromises the security of the communications. Additionally, the NAI may be known to the PDSN for account reporting and policy retrieval from the PCRF, for example.

Figure 2:
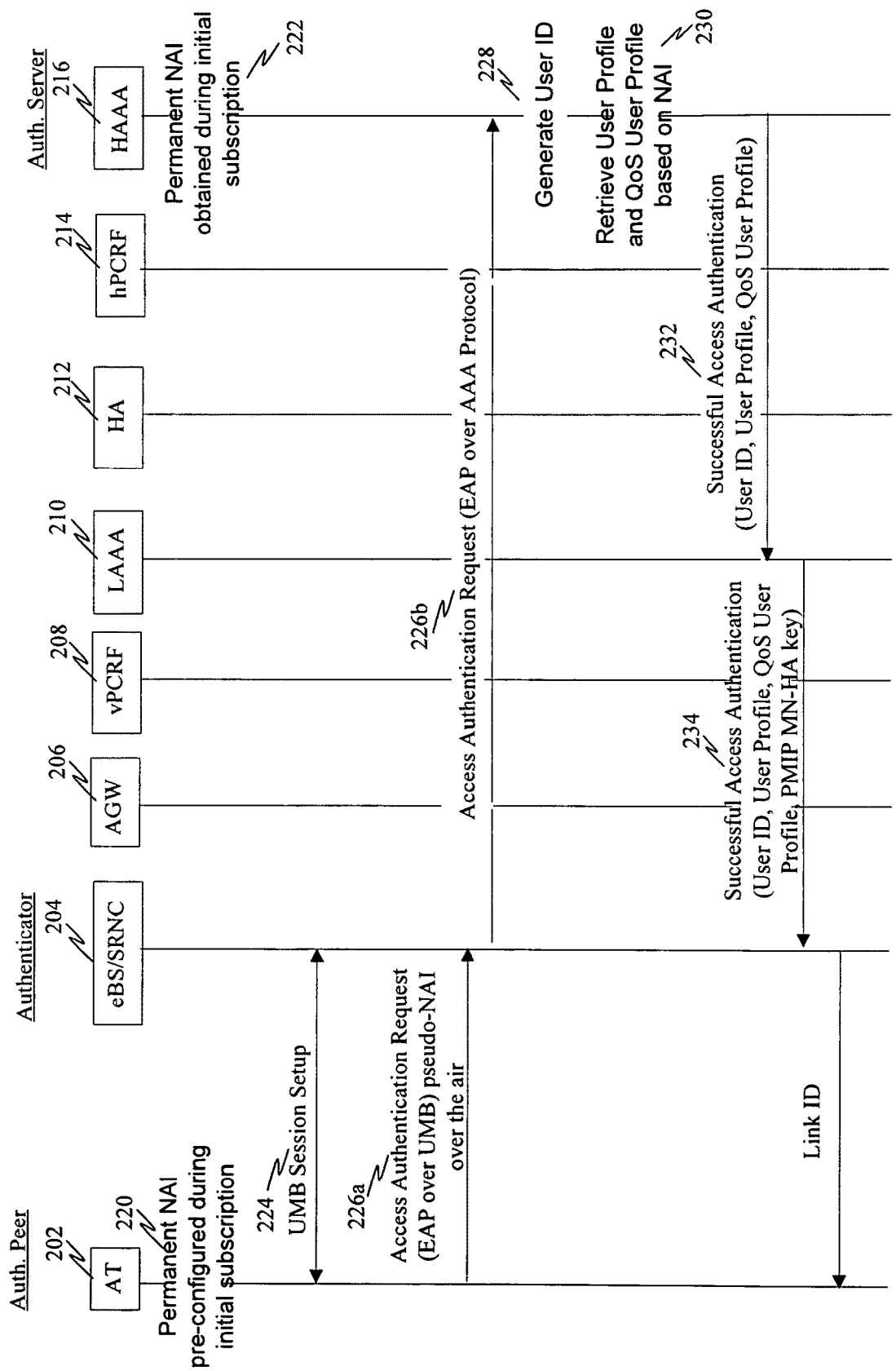
FIG. 2 is a flow diagram illustrating an authentication method by which a network access identifier (NAI) is not transmitted over-the-air during a network access authentication between an access terminal (AT) and home authentication, authorization, and accounting (HAAA) entity.

FIG. 2 is a flow diagram illustrating an authentication method by which a network access identifier (NAI) is not transmitted over-the-air during a network access authentication between an access terminal (AT) and home authentication, authorization, and accounting (HAAA) entity. For instance, during an initial subscription, the AT 202 and HAAA 216 may both obtain a NAI associated with the AT 202. This NAI may be stored in a subscriber identity module (SIM) card, for example, at the AT 202 and known to the HAAA 216. In some implementations, a pseudo-NAI may also be obtained during the initial subscription process. The pseudo-NAI may be generated by either the HAAA 216 or AT 202 and known to both the HAAA 216 and AT 202. The pseudo-NAI may be associated with the NAI for the AT 202 so that both the HAAA 216 and AT 202 can use it during a subsequent access authentication process.

To establish communications with a servicing eBS 204, the AT 202 may setup a UMB session 224. The AT may then send an Access Authentication Request 226a and 226b to the HAAA 216 via the eBS 204. The Access Authentication Request 226 may be sent in an Extensible Authentication Protocol (EAP) (or some other secure authentication protocol) over UMB to the eBS 204 and then in EAP over an AAA Protocol to the HAAA 216. The Authentication Request 226 may include the pseudo-NAI (e.g., obtained during the initial subscription) so that the requesting AT 202 can be identified by the HAAA 216 for purposes of authentication.

In other implementations, where a pseudo-NAI has not been obtained from the HAAA, the AT 202 may send the actual NAI in the Authentication Request 226. However, this is done just the first time and a pseudo-NAI (e.g., provided by the HAAA 216) may be used subsequently, thereby limiting the transmission of the actual NAI over the air.

The HAAA 216 generates a User ID that it may associate with the NAI or requesting AT 228. For instance, the User ID may be a random number generated by the HAAA, or it may be a function of (at least partially) the NAI, or (in some implementations) it may be the NAI.

The HAAA 216 may also retrieve a User Profile and QoS User Profile (e.g., from the hPCRF 214 or vPCRF 208) based on the NAI for the requesting AT 202. In one example, the User Profile and QoS User Profile may define the type of service, service plan, service restrictions, etc., associated with the requesting AT 202. In some implementations, the HAAA 216 may also generate a new pseudo-NAI that it may send to the AT 202 to be used in subsequent authentication requests.

A Successful Access Authentication message 232 may then be sent to the LAAA 210 which may include the User ID, User Profile, QoS User Profile, and (possibly) the new pseudo-NAI. In turn the LAAA 210 may forward the User ID, User Profile, and QoS User Profile, and a PMIP MN-HA key to the SRNC 204. The SRNC 204 may provide the PMIP MN-HA key to the AGW 206; subsequently, the SRNC 204 and/or AGW 206 may use this User ID for accounting report and policy retrieval without knowledge of the NAI.

In the instance where the User ID is a random number (e.g., associated with the NAI by the HAAA), the User ID can be used by the serving network without knowledge of the NAI. As a result of this scheme, the requesting ATs NAI is not sent over the air and is know to a limited number of core infrastructure entities (e.g., HAAA).

In other instances, the User ID may be the NAI but is distributed by the HAAA 216 to the serving network and is not transmitted over the air by the AT 202.

Figure 3:
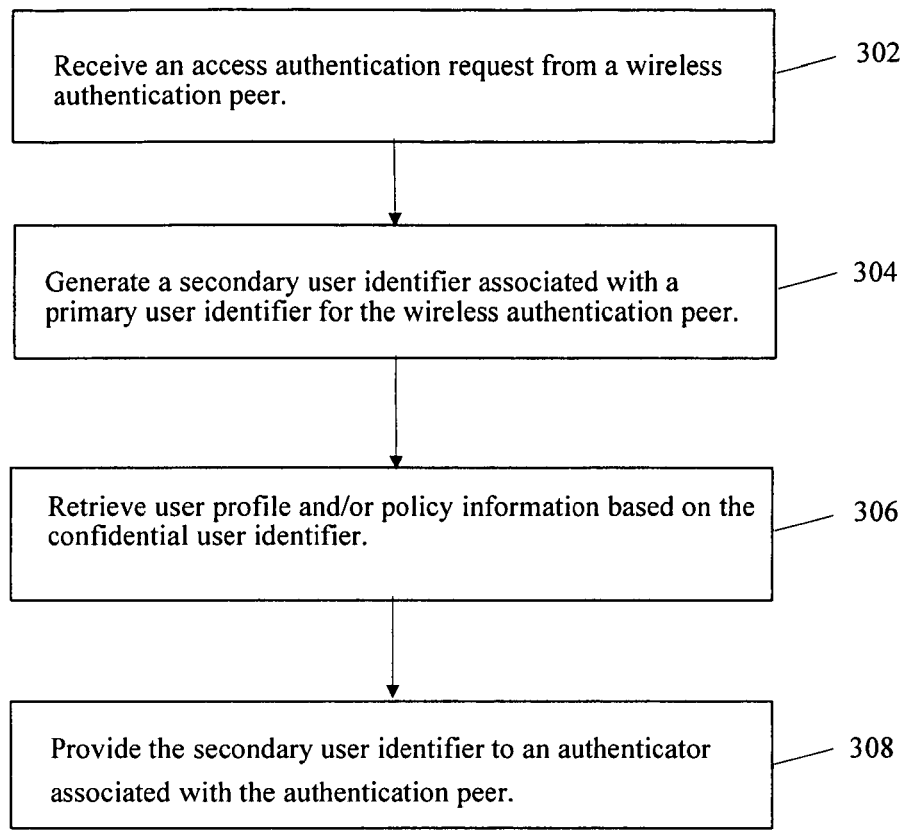
FIG. 3 illustrates a method operational m an authentication server (e.g., HAAA) for a wireless communication network is provided for securing a primary user key.

FIG. 3 illustrates a method operational in an authentication server (e.g., HAAA) for a wireless communication network is provided for securing a primary user key. An access authentication request is received from a wireless authentication peer (e.g., AT) 302. A secondary user identifier (e.g., User ID) may be generated, wherein the secondary user key is associated with a primary user identifier (e.g., NAI) for the wireless authentication peer 304. User profile information (e.g., User Profile) may be retrieved based on the primary user identifier 306. The secondary user identifier may be provided to an authenticator (e.g., SNRC) associated with the authentication peer 308. The user profile information may be sent to the authenticator (e.g., SRNC). The communication network may include at least one of an Ultra Mobile Broadband (UMB) compatible network, a WiMAX compatible network, or a Long Term Evolution (LTE) compatible network. The authentication server (e.g., HAAA) may be an authentication, authorization, and accounting entity (AAA), and the authentication peer is a wireless access terminal (AT). The authenticator may be a session reference network controller (SRNC) associated with a base station (BS) serving the wireless access terminal (AT) in an Ultra Mobile Broadband (UMB) compatible network, and the primary user identifier is a network access identifier (NAI) for the wireless access terminal. The serving base station may be collocated with the session reference network controller (SRNC).

The secondary user identifier may be a randomly generated number that is subsequently associated with the primary user identifier. The secondary user identifier may also be the primary user identifier. The secondary user identifier may be a function of the primary user identifier.

Figure 15:
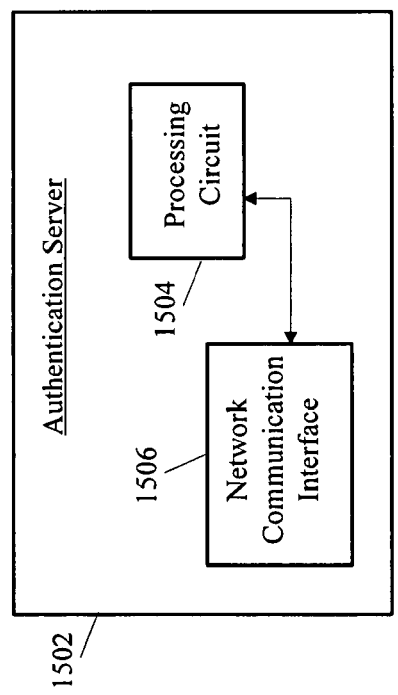
FIG. 15 is a block diagram illustrating an authentication server. The authentication server may include a processing circuit 1504 coupled to a network communication interface.

FIG. 15 is a block diagram illustrating an authentication server. The authentication server 1500 may include a processing circuit 1504 coupled to a network communication interface 1506. The processing circuit 1504 may be adapted to: (a) receive an access authentication request from a wireless authentication peer; (b) generate a secondary user identifier associated with a primary user identifier for the wireless authentication peer; (c) provide the secondary user identifier to an authenticator associated with the authentication peer; (d) retrieve user profile information based on the primary user identifier; (e) provide the user profile information to the authenticator.

Consequently, an authentication server may be provided comprising: (a) means for receiving an access authentication request from a wireless authentication peer; (b) means for generating a secondary user identifier associated with a primary user identifier for the wireless authentication peer; (c) means for providing the secondary user identifier to an authenticator associated with the authentication peer; (d) means for retrieving user profile information based on the primary user identifier; and/or (e) means for providing the user profile information to the authenticator.

A computer program operational on an authentication server for securing a primary user identifier may also be provided, which when executed by a processor causes the processor to: (a) receive an access authentication request from a wireless authentication peer; (b) generate a secondary user identifier associated with a primary user identifier for the wireless authentication peer; (c) provide the secondary user identifier to an authenticator associated with the authentication peer; (d) retrieve user profile information based on the primary user identifier; and/or (e) provide the user profile information to the authenticator.

Distribution of User Profile and Policy to AGW

Figure 4:
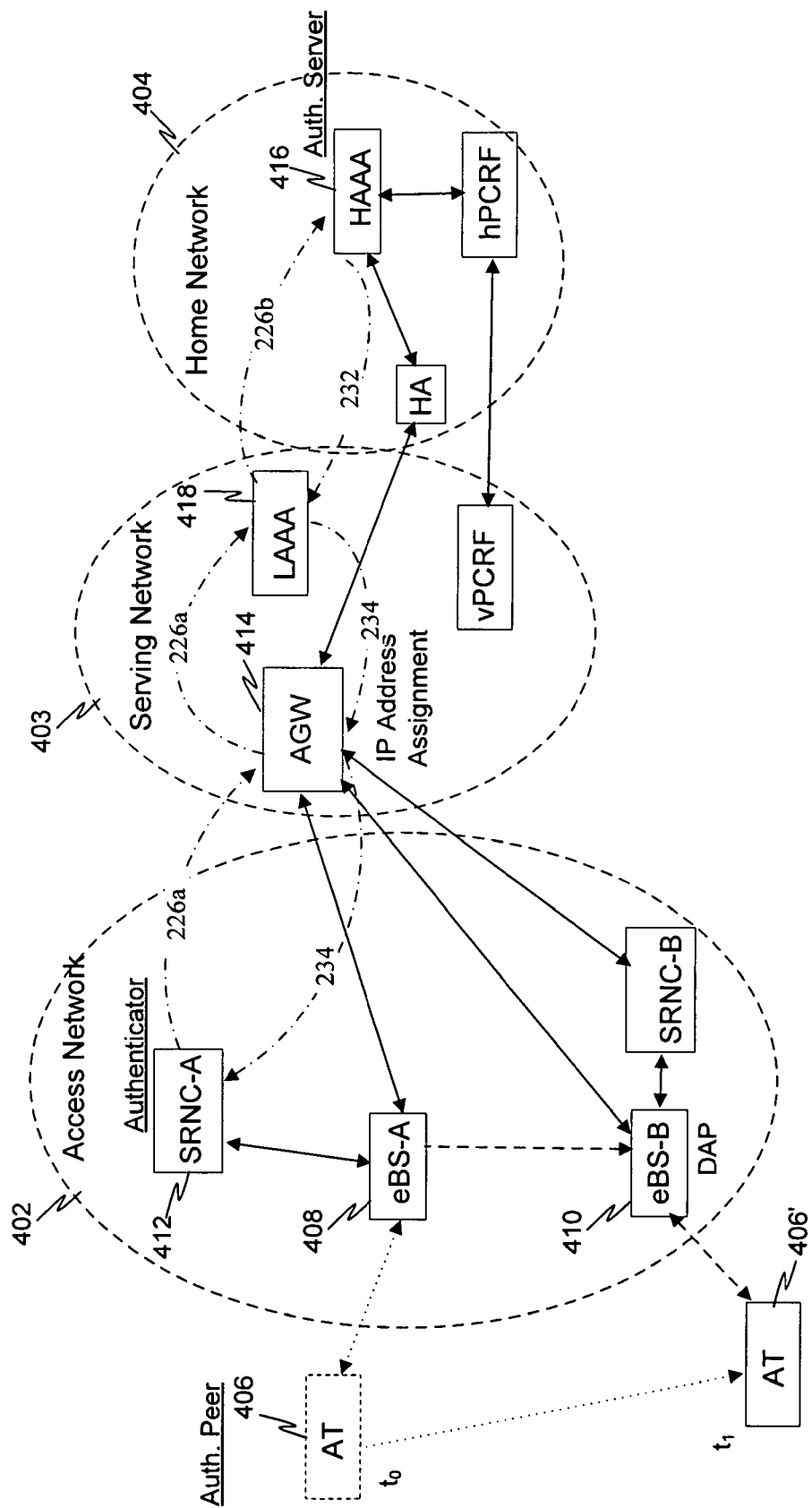
FIG. 4 is a block diagram illustrating how wireless service may be provided to an AT as it moves from a first eBS to a second eBS in a UMB network.

FIG. 4 is a block diagram illustrating how wireless service may be provided to an AT as it moves from a first eBS to a second eBS in a UMB network. In UMB networks, more functions are performed near the wireless interface with the AT 406. One of these functions is to allow the AT 406 to move or roam between eBSs (e.g., from a first eBS-A 408 at time $t_0$ to a second eBS-B 410 at a time $t_1$) of the access network 402 while making such mobility transparent to the home network 404. To keep the mobility of the AT 406 hidden from the home network 404, the AGW 412 in the serving network 403 manages forwarding to the currently serving eBS.

As illustrated in FIG. 2, the SRNC-A 412 may be part of the authentication process. The path of the authentication request message 226*a* and 226*b* (of FIG. 2) and the successful authentication message 232 and 234 is illustrated in FIG. 4. If the AT 406 is successfully authenticated by the HAAA 416, the SRNC-A 412 receives the User ID, User Profile, QoS User Profile, PMIP MN-HA key. However, as an AT moves from the first eBS 408 to the second eBS 410 within the same access network 402, the AGW 414 may hide the ATs mobility from the home network infrastructure 404. However, to accomplish this, the AGW 414 should know the User Profile and Policy information for the AT 406 in order to properly determine the type of service (e.g., quality of service, etc.) that should be provided via the second eBS-B 410.

Figure 5:
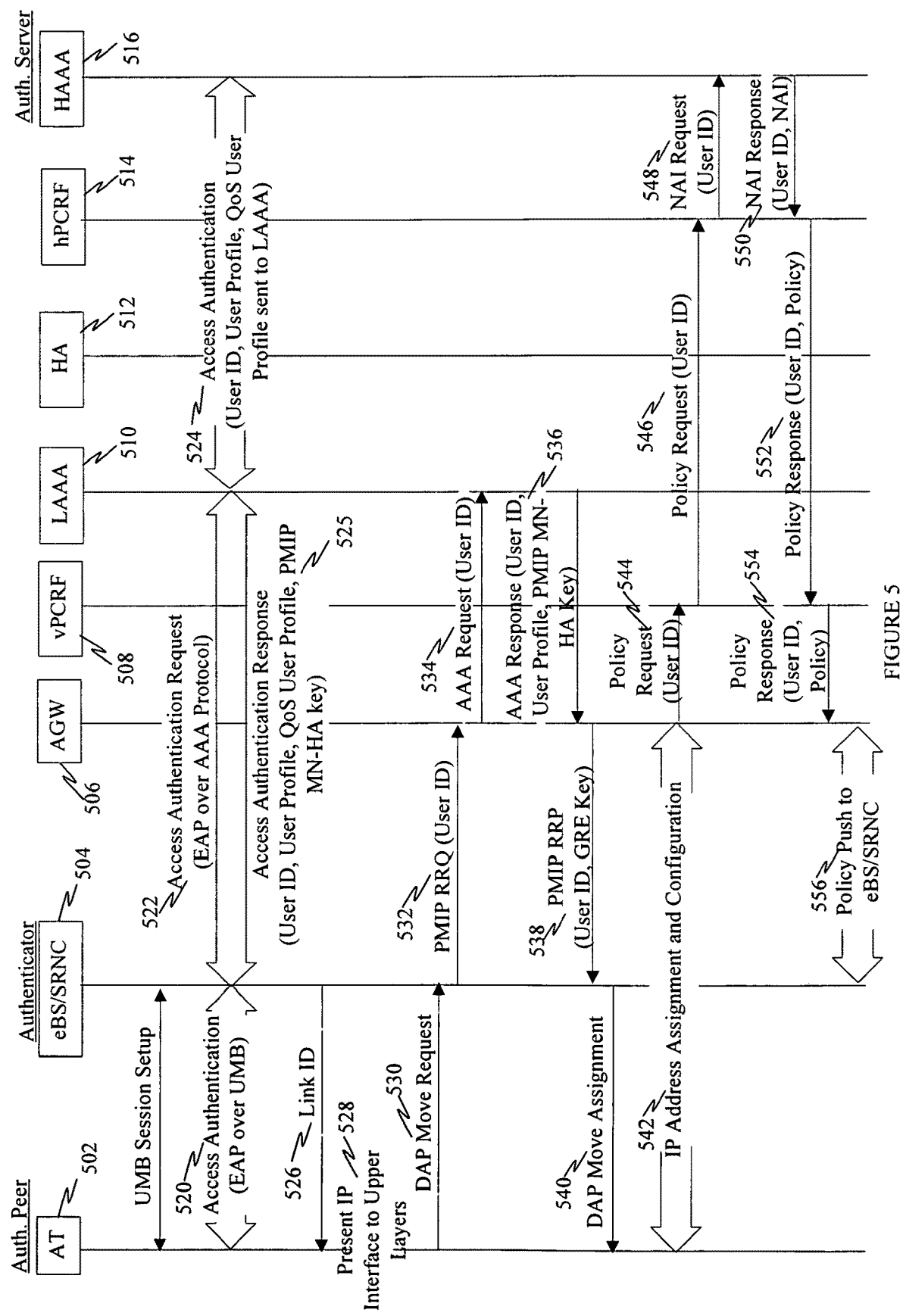
FIG. 5 illustrates how an AGW may retrieve the User Profile from an LAAA when a new PMIP tunnel is established and request User Policy from the PCRF in a distributed SRNC configuration.
Figure 6:
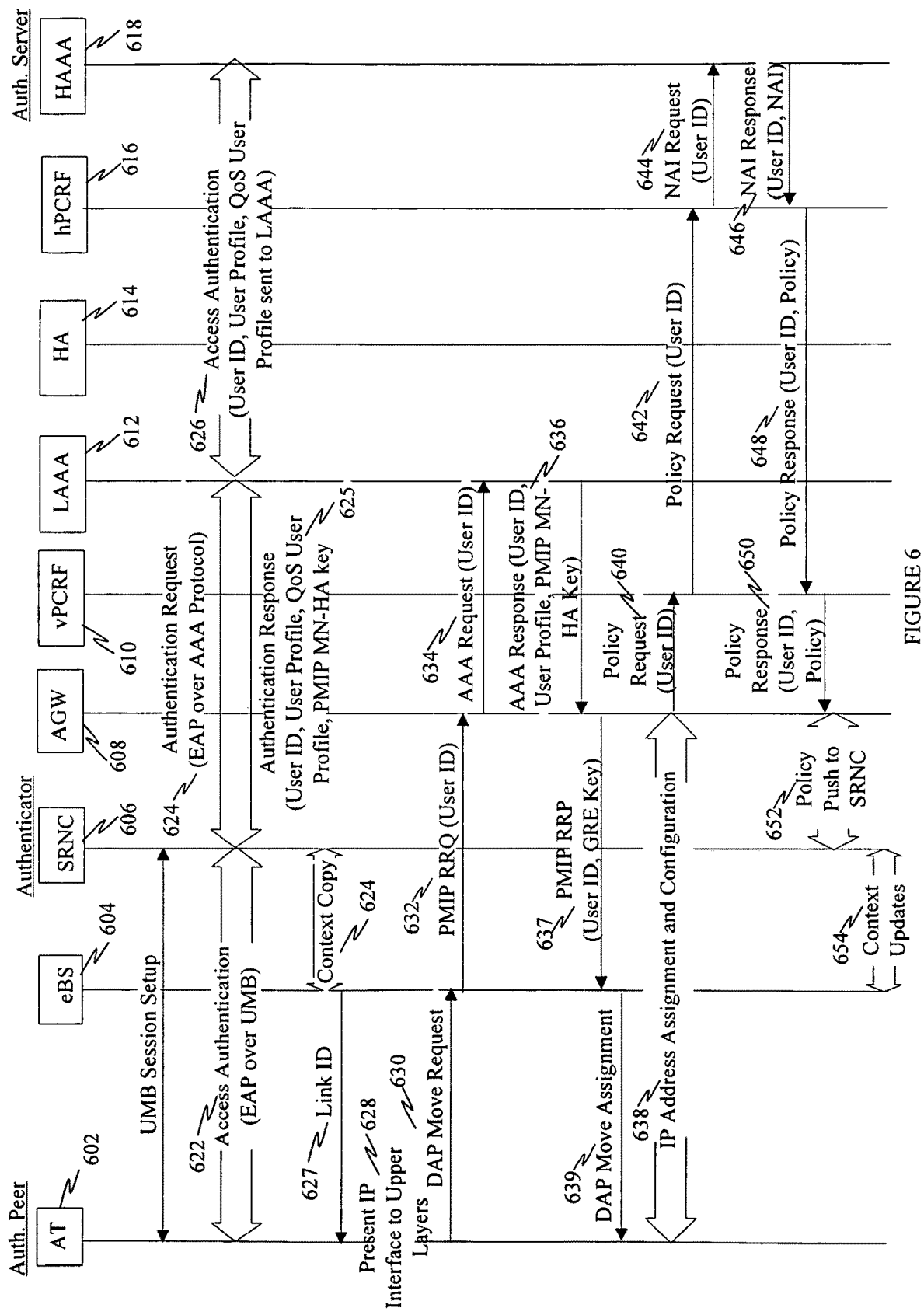
FIG. 6 illustrates how an AGW may retrieve the User Profile from an LAAA when a new PMIP tunnel is established and request User Policy from the PCRF in a centralized SRNC configuration.
Figure 7:
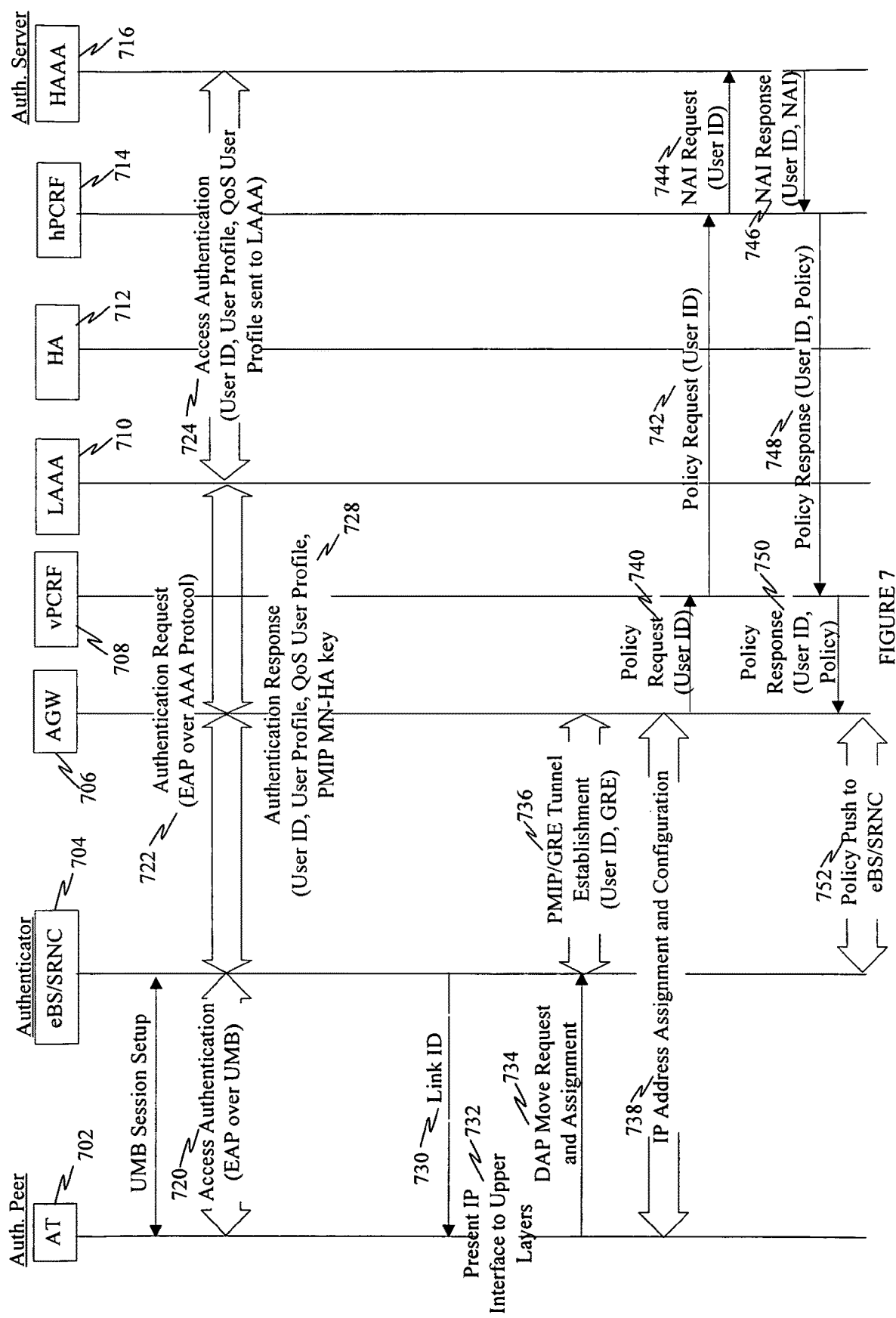
FIG. 7 illustrates how an AGW may obtain User Profile information as part of an authentication process and User Policy from a PCRF in a distributed SRNC configuration.
Figure 8:
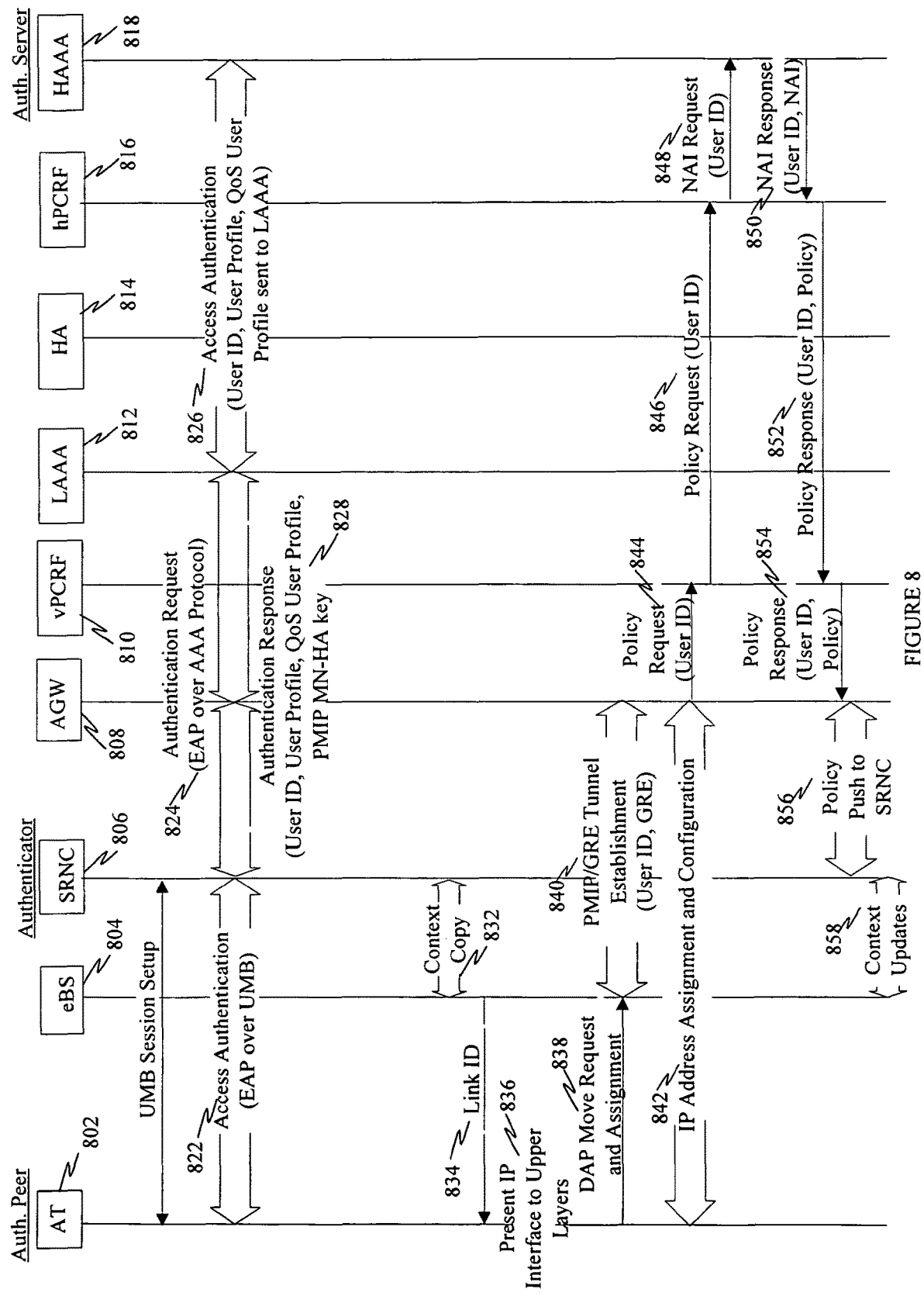
FIG. 8 illustrates how an AGW may obtain User Profile information as part of an authentication process and User Policy from a PCRF in a distributed SRNC configuration.
Figure 9:
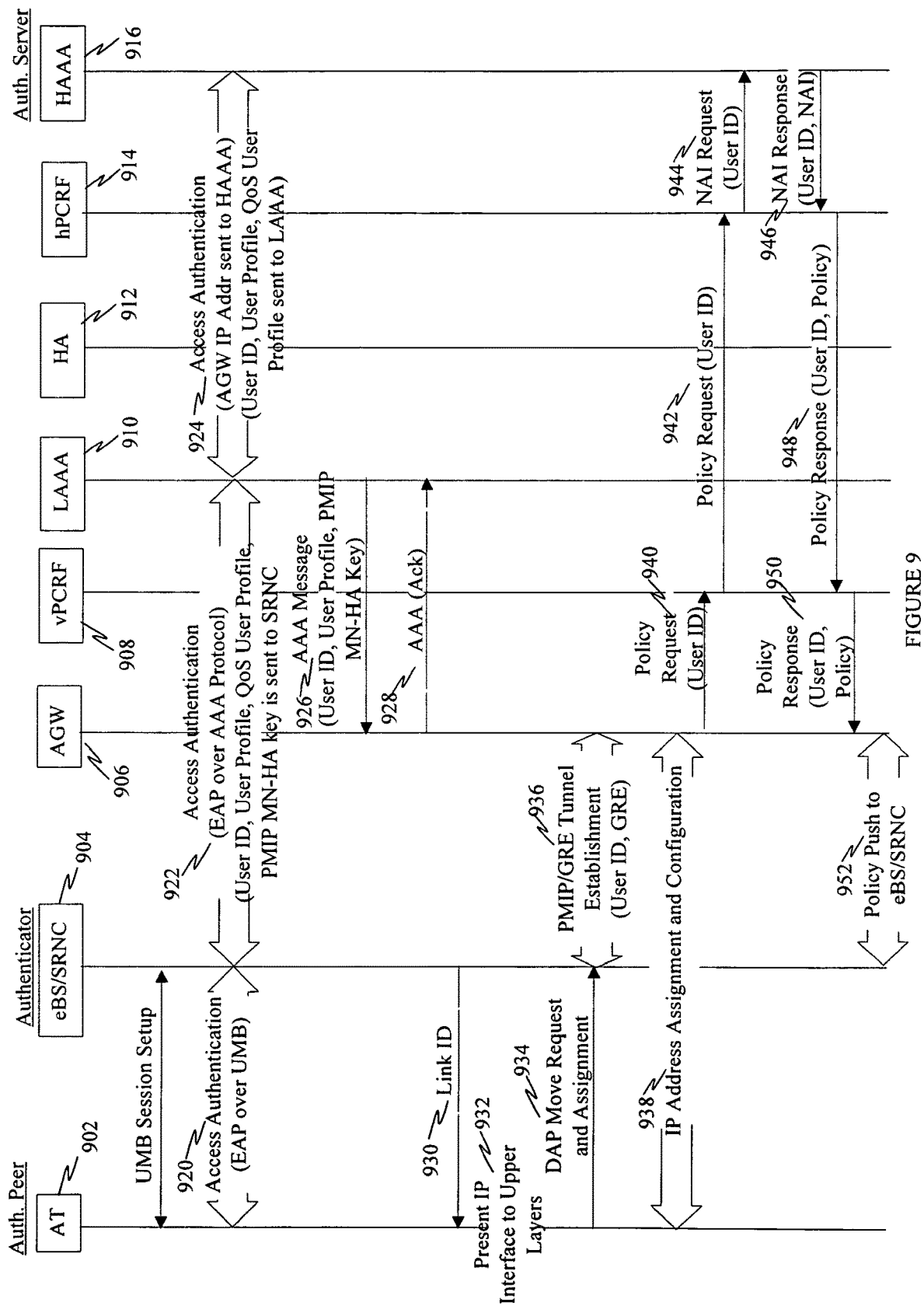
FIG. 9 illustrates how an LAAA may push the User Profile to the AGW and the AGW may request the User Policy from a PCRF in a distributed SRNC configuration.
Figure 10:
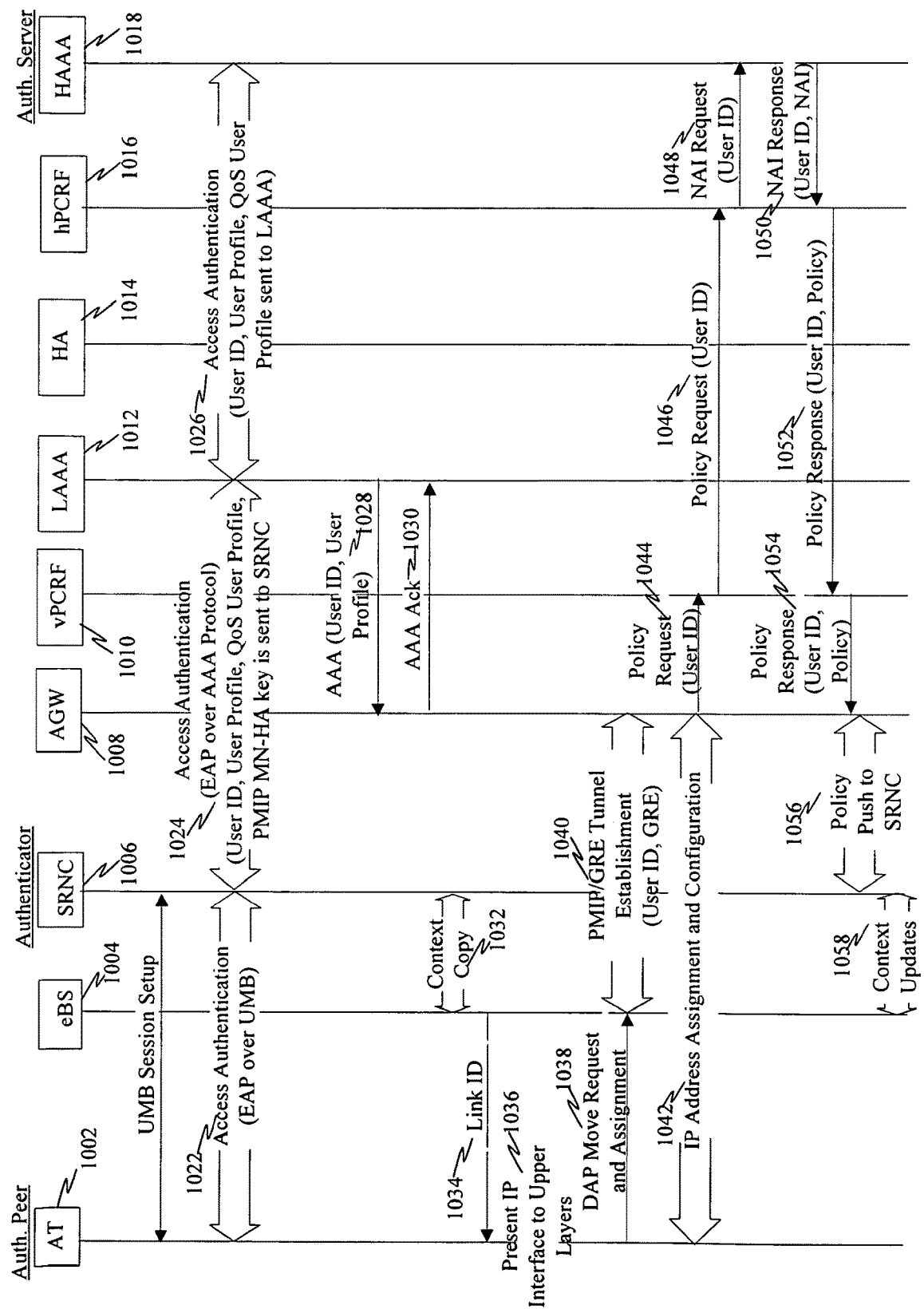
FIG. 10 illustrates how an LAAA may push the User Profile to an AGW and the AGW may request User Policy from a PCRF in a centralized SRNC configuration.

Three alternative methods are proposed for providing the user profile information to the AGW. First, the AGW 414 may retrieve the User Profile from the LAAA 418 and User Policy from a PCRF when a new PMIP tunnel is established. FIGS. 5 and 6 illustrate how an AGW may retrieve the User Profile from an LAAA when a new PMIP tunnel is established and User Policy from a PCRF in distributed and centralized SRNC configurations, respectively. Second, the AGW 414 may obtain the User Profile information during an authentication process and User Policy information from a PCRF. FIGS. 7 and 8 illustrate how an AGW may obtain User Profile information as part of an authentication process and User Policy from a PCRF in distributed and centralized SRNC configurations, respectively. Third, the LAAA 418 may push the User Profile to the AGW 414 and the AGW may then request the User Policy from the PCRF. FIGS. 9 and 10 illustrate how an LAAA may push the User Profile to the AGW 414 and the AGW may request the User Policy from a PCRF in distributed and centralized SRNC configurations, respectively.

Note that in a distributive SRNC configuration, the SRNC may be collocated with the eBS (e.g., FIG. 1—eBS-a 114 and SRNC-a 104) while in a centralized SRNC configuration, the SRNC may be separate from the eBS and serve one or more eBSs (e.g., FIG. 1—SRNC-c 118, eBS-c 116 and eBS-d 117).

FIG. 5 illustrates how an AGW may retrieve the User Profile from an LAAA when a new PMIP tunnel is established and request User Policy from the PCRF in a distributed SRNC configuration. An authentication process 520, 522, 524, and 525 may be performed where the AT 502 sends an Authentication Request to the HAAA 516. If the AT is authenticated by the HAAA 616, the HAAA 616 generates a User ID and other User Profile information in response. As part of the authentication response 525, the eBS/SRNC 504 may receive the User Profile from the LAAA 510.

Once access authentication has been performed, the AT 502 may move from a data anchor point (DAP) eBS 504 to a new serving eBS. The new serving eBS may send a DAP Move Request 530 via the new serving eBS/SRNC. A proxy mobile IP (PMIP) registration request (RRQ) message 532 (including a User ID for AT 502) is sent by the new serving eBS/SRNC to the AGW 506 which, in turn, sends an AAA Request (User ID) message 534 to the LAAA 510. The LAAA 510 retrieves the user profile information (e.g., User Profile, PMIP MN-HA Key, etc.) associated with the requesting AT and sends it to the AGW 506. The AGW 506 may send a PMIP registration response (RRP) message 538 to the eBS/SRNC 504 which then sends a DAP Move Assignment message 540 to the AT 502.

During a process in which a new IP address and/or configuration 542 may be associated with the AT 502, the AGW 506 (with knowledge of the User ID), is able to obtain the User Policy for the AT associated with the User ID. The AGW 506 may send a Policy Request (User ID) 544 to the vPCRF 508 which may be forwarded 546 to the hPCRF 514. Because the hPCRF 514 does not know the mapping between the User ID and the NAI associated with the User Policy, it may then send an NAI Request (User ID) 548 to the HAAA 516. The HAAA 516 responds with a NAI Response (User ID, NAI) 550 which the hPCRF 514 can use to obtain the User Policy associated with the User ID and NAI. That is, the hPCRF 514 uses the NAI to obtain the User Policy corresponding to the AT associated with the User ID. A Policy Response (User ID, User Policy) 552 is sent by the hPCRF 514 to the vPCRF 508 which then sends a Policy Response (User ID, User Policy) 554 to the AGW 506. The AGW 506 may then push or send 556 the User Policy to the eBS/SRNC 504.

According to one example, the AT 502 may authorize retrieval of user profile and/or policy information by including a MAC in the DAP Move Request message 530. The MAC may be created based on some static data, along with some dynamic information, such as a sequence number. The key for MAC generation may be derived from an EAP keying hierarchy (e.g., a key from the DSRK—Domain Specific Root Key) shared between the AT 502 and the HAAA 516 (or LAAA). For instance, the MAC generation key may be based on an authorization key AK which is part of the EAP key hierarchy (e.g., AK=f(DSRK), where f is some function, such as a pseudo random function like HMAC_SHA256). The authorization data included in the DAP Move Request 530 message from the AT 502 may be sent to the LAAA 510 via the AGW 506. Upon successful verification of the MAC, the LAAA 510 sends the user profile to the AGW 506.

For policy retrieval from the PCRF, a similar approach could be used. The key used in this case should come from the key shared between the AT and the HAAA (a key from the EAP EMSK can be generated similar as above FIG. 6 illustrates how an AGW may retrieve the User Profile from an LAAA when a new PMIP tunnel is established and request User Policy from the PCRF in a centralized SRNC configuration. An authentication process 622, 624, 626, and 625 may be performed where the AT 602 sends an Authentication Request to the HAAA 618. If the AT 602 is successfully authenticated by the HAAA 618, the HAAA 618 generates a User ID and obtains other User Profile information in response. As part of the authentication response, the SRNC 606 may receive 625 the User Profile from the LAAA 610.

Once access authentication has been performed, the AT 602 may move from a data anchor point (DAP) eBS 604 to a new serving eBS. A proxy mobile IP (PMIP) RRQ message 632 (including a User ID for AT 602) is sent by the new serving eBS to the AGW 608 which, in turn, sends an AAA Request message 634 (including the User ID for AT 602) to the LAAA 612. The LAAA 612 retrieves the user profile information (e.g., User Profile, PMIP MN-HA Key, etc.) associated with the requesting AT 602 and sends it to the AGW 608. The AGW 608 may send a PMIP RRP message 637 to the new serving eBS which then sends a DAP Move Assignment message 639 to the AT 602.

For the implementations illustrated in FIGS. 5 and 6, if security is the concern, the AT's signature (e.g., a hash of the MN-HA key) can be included in DAP Move Request/PMIP RRQ and the HAAA can check it before sending the NAI (associated with the requesting AT) to the hPCRF to retrieve the user profile and/or policy information.

During a process in which a new IP address and/or configuration 638 may be associated with the AT 602, the AGW 608 (with knowledge of the User ID) may be able to obtain the User Policy for the AT associated with the User ID. The AGW 608 may send a Policy Request (User ID) 640 to the vPCRF 610 which may be forwarded 642 to the hPCRF 616. Because the hPCRF 616 does not know the mapping between the User ID and the NM associated with the User Policy, it may then send an NAI Request (User ID) 644 to the HAAA 618. The HAAA 618 responds with a NAI Response (User ID, NAI) 646 which the hPCRF 616 can use to obtain the User Policy associated with the User ID and NAI. That is, the hPCRF 616 uses the NAI to obtain the User Policy corresponding to the AT associated with the User ID. A Policy Response (User ID, User Policy) 648 is sent by the hPCRF 616 to the vPCRF 610 which then sends a Policy Response (User ID, User Policy) 650 to the AGW 608. The AGW 608 may then push or send the User Policy to the SRNC 606 which may copy part or all of such information 654 to the eBS 604.

FIG. 7 illustrates how an AGW may obtain User Profile information as part of an authentication process and User Policy from a PCRF in a distributed SRNC configuration. An authentication process 720, 722, 724, 728 may be performed where the AT 702 sends an Authentication Request to the HAAA 716. If the AT 702 is successfully authenticated by the HAAA 716, the HAAA 716 generates a User ID and obtains other User Profile information in response. As part of the authentication response, the SRNC AGW 706 may receive the User Profile from the LAAA 710. The eBS/SRNC 704 may then receive user profile information (e.g., User ID, User Profile, and/or PMIP MN-HA Key) from the AGW 706.

During a process in which a new IP address and/or configuration 738 may be associated with the AT 702, the AGW 706 (with knowledge of the User ID) may be able to obtain the User Policy for the AT associated with the User ID. The AGW 706 may send a Policy Request (User ID) 740 to the vPCRF 708 which may be forwarded 742 to the hPCRF 714. Because the hPCRF 714 does not know the mapping between the User ID and the NM associated with the User Policy, it may then send an NAI Request (User ID) 744 to the HAAA 716. The HAAA 716 responds with a NAI Response (User ID, NAI) 746 which the hPCRF 714 can use to obtain the User Policy associated with the User ID and NAI. That is, the hPCRF 714 uses the NAI to obtain the User Policy corresponding to the AT associated with the User ID. A Policy Response (User ID, User Policy) 748 is sent by the hPCRF 714 to the vPCRF 708 which then sends a Policy Response (User ID, User Policy) 748 to the AGW 706. The AGW 706 may then push or send the User Policy to the eBS/SRNC 704.

FIG. 8 illustrates how an AGW may obtain User Profile information as part of an authentication process and User Policy from a PCRF in a distributed SRNC configuration. As part of an access authentication, the SRNC 806 may receive user profile information (e.g., User ID, User Profile, and/or PMIP MN-HA Key). The SRNC 806 may the push or send the user profile information (e.g., User ID, User Profile, and/or PMIP MN-HA Key) to the AGW 808 in an AAA Request message 828 and receives an AAA Ack message 830 from the AGW 808.

An authentication process 822, 824, 826, 828 may be performed where the AT 802 sends an Authentication Request to the HAAA 818. If the AT 802 is successfully authenticated by the HAAA 818, the HAAA 818 generates a User ID and obtains other User Profile information in response. As part of the authentication response, the AGW 808 may receive the user profile information (e.g., User ID, User Profile, and/or PMIP MN-HA Key) from the LAAA 812. The AGW 808 may then forward this user profile information to the SRNC 806 which may copy 832 some or all of it to the eBS 804.

Once access authentication has been performed, the AT 802 may move from a data anchor point (DAP) eBS 804 to a new serving eBS. During a process in which a new IP address and/or configuration 842 may be associated with the AT 802, the AGW 808 (with knowledge of the User ID) may be able to obtain the User Policy for the AT associated with the User ID. The AGW 808 may send a Policy Request (User ID) 844 to the vPCRF 810 which may be forwarded 846 to the hPCRF 816. Because the hPCRF 816 does not know the mapping between the User ID and the NAI associated with the User Policy, it may then send an NAI Request (User ID) 848 to the HAAA 818. The HAAA 818 responds with a NAI Response (User ID, NAI) 850 which the hPCRF 816 can use to obtain the User Policy associated with the User ID and NAI. That is, the hPCRF 816 uses the NAI to obtain the User Policy corresponding to the AT associated with the User ID. A Policy Response (User ID, User Policy) 852 is sent by the hPCRF 816 to the vPCRF 810 which then sends a Policy Response (User ID, User Policy) 854 to the AGW 808. The AGW 808 may then push or send 856 the User Policy to the SRNC 806 which may copy 858 part or all of such information to the eBS 804.

FIG. 9 illustrates how an LAAA may push the User Profile to the AGW 414 and the AGW may request the User Policy from a PCRF in a distributed SRNC configuration. An authentication process 920, 922, and 924 may be performed where the AT 902 sends an Authentication Request to the HAAA 916. If the AT is authenticated by the HAAA 916, the HAAA 916 generates a User ID and other User Profile information in response. As part of the authentication response, the eBS/SRNC 904 may receive the User Profile from the LAAA 910. Subsequently, the LAAA 910 may push or send an AAA message (User ID, User Profile, PMIP MN-HA Key) 926 to the AGW 906. The AGW 906 may acknowledge 928 receipt of the message 926. The User Policy may be obtained by the AGW by a process similar to the processes illustrated in FIGS. 5 and 7.

FIG. 10 illustrates how an LAAA may push the User Profile to an AGW and the AGW may request User Policy from a PCRF in a centralized SRNC configuration. An authentication process 1022, 1024, and 1026 may be performed where the AT 1002 sends an Authentication Request to the HAAA 1018. If the AT 1002 is authenticated by the HAAA 1018, the HAAA 1018 generates a User ID and other User Profile information in response. As part of the authentication response, the SRNC 1006 may receive the User Profile from the LAAA 1012. Subsequently, the LAAA 1012 may push or send an AAA message (User ID, User Profile, PMIP MN-HA Key) 1028 to the AGW 1008. The AGW 1008 may acknowledge 1030 receipt of the message 1028. The User Policy may be obtained by the AGW by a process similar to the process illustrated in FIGS. 5 and 7 and 9.

Figure 11:
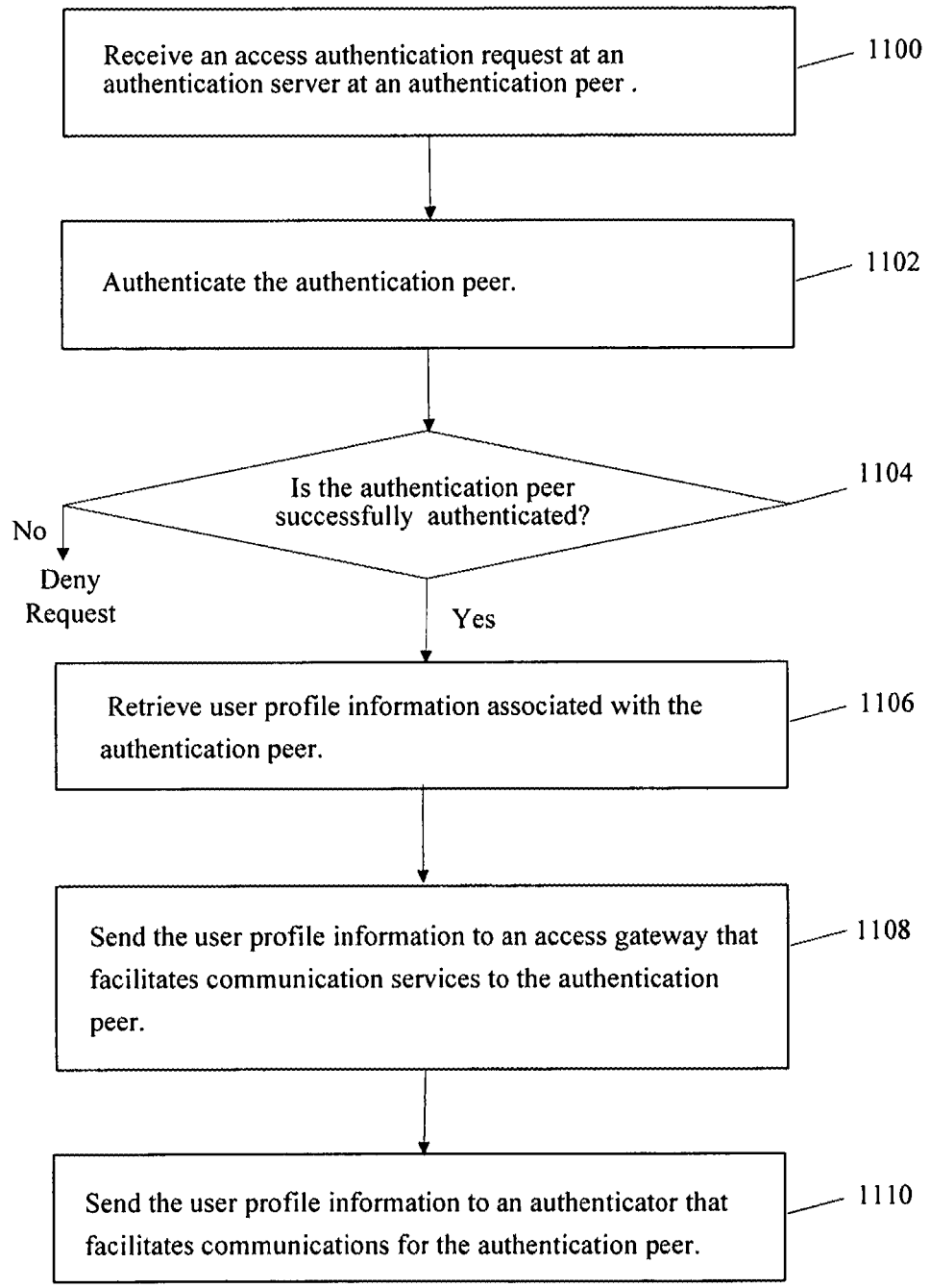
FIG. 11 illustrates a method operational an authentication server for providing an authenticator with user profile information.

FIG. 11 illustrates a method operational an authentication server for providing an authenticator with user profile information. An authentication server (e.g., HAAA) may receive an access authentication request from the authentication peer (e.g., AT) 1100 and verifies whether the authentication peer is a valid subscriber of the communication network (e.g., UMB network). An authentication server may authenticate an authentication peer seeking to establish communications via a first network access node 1102. If the authentication peer is successfully authenticated by the authentication server 1104, the authentication server retrieves user profile information associated with the authentication peer 1106. The authentication server then sends the user profile information to a network gateway node that facilitates communication services for the authentication peer 1108. Similarly, the authentication server may also send the user profile information to an authenticator that facilitates communications for the authentication peer 1110. Such user profile information may provide, for example, a grade or quality of service for the authentication peer. In one example, the authentication server may be an authentication, authorization, and accounting (AAA) entity that is part of the communication network. In one implementation, sending the user profile information to the network gateway node may include having the authenticator send the user profile information to the network gateway node. The user profile information may be provided according to one or more of the methods illustrated in FIGS. 5-10.

Referring again to FIG. 15, the processing circuit 1504 of authentication server 1500 may be adapted to: (a) authenticate an authentication peer seeking to establish communications via a first network access node; (b) retrieve user profile information associated with the authentication peer; (c) send the user profile information to a network gateway node that facilitates communication services for the authentication peer; (d) send the user profile information to an authenticator that facilitates communications for the authentication peer; (e) receive a primary user identifier request from a PCRF entity, wherein the primary user identifier is uniquely associated with the authentication peer; and/or (0 send a reply to the PCRF entity including the requested the primary user identifier.

Consequently, an authentication server may be provided comprising: (a) means for authenticating an authentication peer seeking to establish communications via a first network access node; (b) means for retrieving user profile information associated with the authentication peer; (c) means for sending the user profile information to a network gateway node that facilitates communication services for the authentication peer; (d) means for sending the user profile information to an authenticator that facilitates communications for the authentication peer; (e) means for receiving a primary user identifier request from a PCRF entity, wherein the primary user identifier is uniquely associated with the authentication peer; and/or (f) means for sending a reply to the PCRF entity including the requested the primary user identifier.

Similarly, computer program operational on an authentication server may also be provided for providing user information, which when executed by a processor causes the processor to: (a) authenticate an authentication peer seeking to establish communications via a first network access node; (b) retrieve user profile information associated with the authentication peer; (c) send the user profile information to a network gateway node that facilitates communication services for the authentication peer; (d) send the user profile information to an authenticator that facilitates communications for the authentication peer; (e) receive a primary user identifier request from a PCRF entity, wherein the primary user identifier is uniquely associated with the authentication peer; and/or (f) send a reply to the PCRF entity including the requested the primary user identifier.

Figure 12:
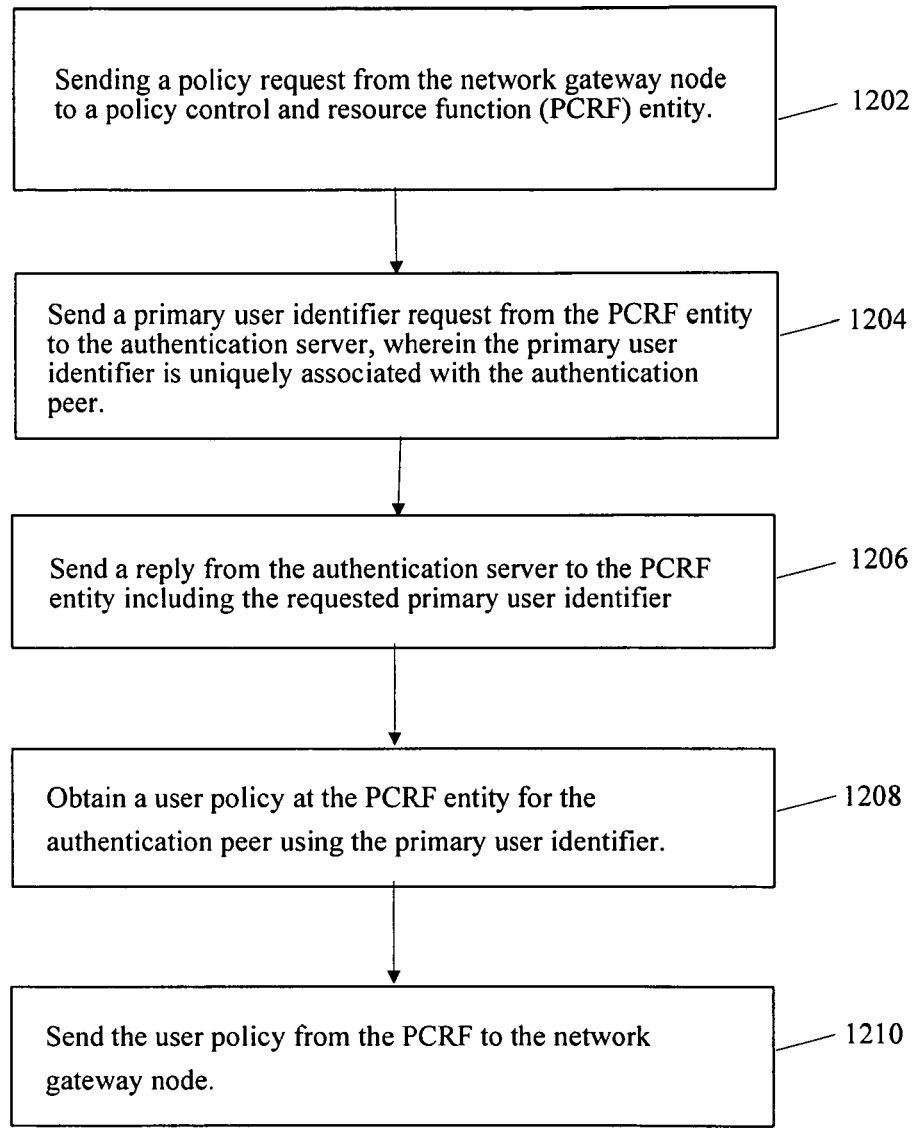
FIG. 12 illustrates a method for providing a network gateway node with user policy information for an authentication peer operational in a communication network.

FIG. 12 illustrates a method for providing a network gateway node with user policy information for an authentication peer operational in a communication network. The method may comprise: (a) sending a policy request from the network gateway node to a policy control and resource function (PCRF) entity 1202, wherein the policy request may be for a user policy for an authentication peer to which the network gateway node facilitates communications; (b) sending a primary user identifier request from the PCRF entity to the authentication server, wherein the primary user identifier is uniquely associated with the authentication peer 1204; (c) sending a reply from the authentication server to the PCRF entity including the requested primary user identifier 1206; (d) obtaining a user policy at the PCRF entity for the authentication peer using the primary user identifier 1208; and/or (e) sending the user policy from the PCRF entity to the network gateway node 1210. For example, the user policy information may be provided according to one or more of the methods illustrated in FIGS. 5-10. The authenticator may be a session reference network controller (SRNC) associated with a base station serving the authentication peer in an Ultra Mobile Broadband (UMB) compatible network, and the confidential identifier is a network access identifier for the wireless access terminal.

Distribution of PMIP Key to Verify New Tunnel Requests

As an AT roams or moves to different eBSs, the AGW managing communications for the AT establishes a proxy mobile IP (PMIP) tunnel to the new serving eBS. However, the AGW has to prevent other eBSs (or intruders) from claiming to be providing wireless connectivity to the AT when they are not. The AGW should be able to prevent an unauthorized entity from changing the PMIP tunnel binding. Therefore, a mobile-node home-agent (MN-HA) key may be used to secure PMIP tunnels between the eBS and AGW and between the SRNC and AGW.

There at least two types of PMIP tunnels, RAN PMIP tunnels between an eBS and AGW and Network PMIP tunnels between AGW and SRNC and between a first AGW and a second AGW. As an AT moves from eBS to eBS (within a serving network), a new RAN PMIP tunnel may be established by the AGW with the new serving eBS. Similarly, as the AT moves or roams into a new access or serving network, the home AGW may establish a network PMIP tunnel with the new access or serving network.

There are several ways to obtain a MN-HA Key that can be used to verify whether a new PMIP tunnel should be established by an AGW. The LAAA can simply pick a random number as a PMIP tunnel MN-HA key provides it to the AGW. Since the AT does not need to know this key, the only entity "deriving" this key is the LAAA. Hence, there is no need for a derivation since a simple strong random number generation is sufficient. The generated random number (i.e., MN-HA key) may be given to the SRNC and/or the AGW for use in verifying whether a new PMIP tunnel (e.g. PMIPv4 tunnel) should be established.

Alternatively, a MN-HA key may be created from the EAP hierarchy, as in the case of the authentication key. For example, the MN-HA key may be a function of the DSRK (Domain Specific Root Key) shared between the AT and the LAAA (e.g., DSRK→P4K (PMIPv4 MN-HA key) or P4K=f (DSRK), where f is some function (e.g., pseudo random function, such as HMAC_SHA256). The generated P4K (i.e., MN-HA key) may be given to the SRNC and/or the AGW for us in securing a PMIP tunnel (e.g. PMIPv4 tunnel).

In some implementations, an MN-HA key may be sent to the AGW together with user profile. For instance, the MN-HA key may be sent to a serving SRNC via successful Access Authentication. In yet other implementations, the MN-HA key may be generated by the AGW itself and distributed to the current serving eBS.

When a mobile first establishes communications on a serving network via an eBS, that eBS and its AGW are provided with a MN-HA Key (which may be obtained as discussed above. When a DAP Move Request is received by the AGW, it may check whether the requesting eBS knows the MN-HA Key. If it does, the AGW may agree to the move request. If, however, the requesting eBS does not know the MN-HA Key, the AGW may deny the move request since the requesting eBS cannot be trusted. Similarly, the MN-HA key may be used to protect move requests from different AGWs or HAs.

Referring again to FIG. 1, in one example an access terminal AT-x 122 may establish wireless service via eBS-c 116. During the process of establishing its wireless service, the AT-x 122 may authenticate itself with the serving and home networks (e.g., as discussed and illustrated with reference to FIGS. 5-10). In one example (where a centralized SRNC is used), as part of this authentication process, an MN-HA key may be provided to (or generated by) the AGW-c 120. The MN-HA key is also provided to the serving SRNC-c 118 that supports the serving eBS-c 116. If at a later time the AT-x 122 moves to eBS-d 117, a DAP Move Request may be generated by which a new PMIP tunnel should be established between the new eBS-d 117 and the serving AGW-c 120. Since the SRNC-c 118 knows the MN-HA key (from previously authentication process), it can provide the MN-HA key the AGW-c 120 to verify that the new tunnel request is valid. Consequently, the AGW-c 120 can establish the new tunnel with eBS-d 117 as requested.

In another example, AT-1 106 initially performs an authentication process as it seeks wireless service via eBS-a 104. Consequently, AGW-a 112 and SRNC-a 114 will know the MN-HA key for their tunnel. If AT-1 106 subsequently wishes to communicate via eBS-b 107, a new tunnel request is sent to the AGW-a 112. However, in this case, the new serving SRNC-b 109 does not know the MN-HA key (e.g., it was initially given to SRNC-a 114). Therefore, in order to verify its new tunnel request as valid, the SRNC-b 109 may obtain the MN-HA key from SRNC-a 114. This allows the AGW to re-route data to the new serving eBS-b 107 without the need to re-authentication. Alternatively, the AT-1 106 may simply re-authenticate itself (e.g., perform the authentication process illustrated in FIGS. 5-10) with the serving and/or home network.

Figure 13:
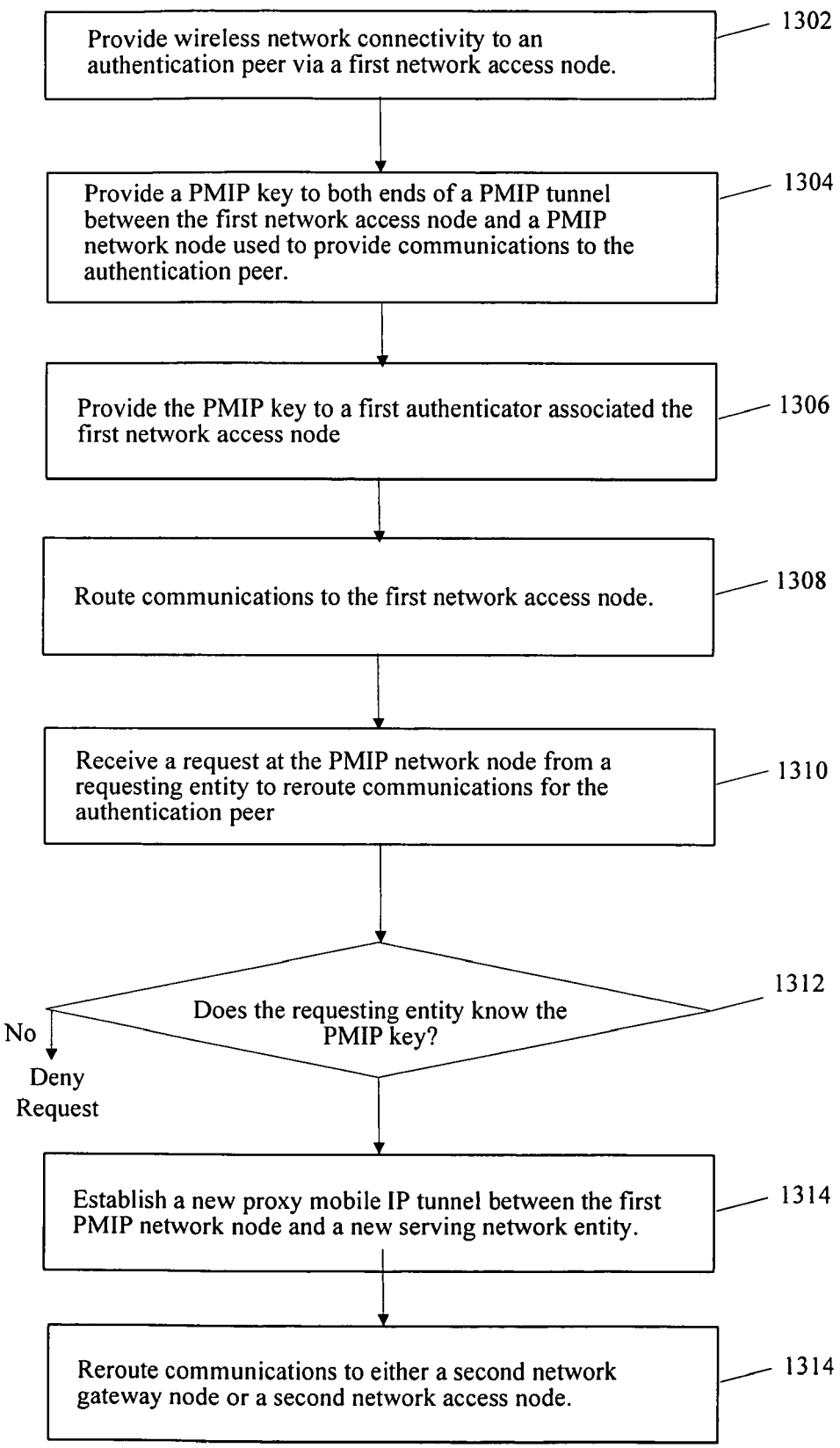
FIG. 13 illustrates a method for verifying new tunnel requests in a communication network.

FIG. 13 illustrates a method for verifying new tunnel requests in a communication network. Wireless network connectivity may be provided to an authentication peer via a first network access node 1302. A proxy mobile IP (PMIP) key is provided to both ends of a PMIP tunnel between the first network access node and a PMIP network node used to provide communications to the authentication peer 1304. The PMIP key is then provided to a first authenticator associated the first network access node 1306 (e.g., via the PMIP tunnel). Communications may then be routed to the first network access node 1308.

Subsequently, a request may be received at the PMIP network node from a requesting entity to reroute communications for the authentication peer 1310. The PMIP network node may verify whether the requesting entity knows the PMIP key 1312. In one example, communications may be rerouted to a second network access node (e.g., new eBS) if the requesting entity successfully proves that it knows the PMIP key. In another example, communications may be rerouted to a second network gateway node (e.g., AGW) if the requesting entity successfully proves that it knows the PMIP key. Rerouting communications may include establishing a new proxy mobile IP tunnel between the first PMIP network node and a new serving network entity 1314. In one example, the PMIP key may be generated at an authentication, authorization, and accounting (AAA) entity or a network gateway node. The PMIP network node may be a network gateway node.

Figure 16:
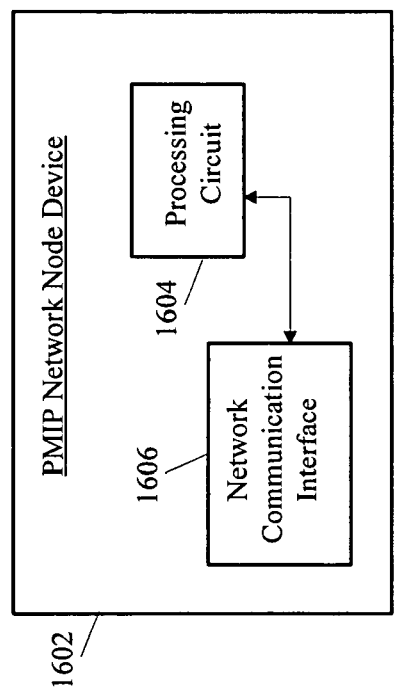
FIG. 16 is a block diagram illustrating an example of a PMIP network node device.

FIG. 16 is a block diagram illustrating an example of a PMIP network node device. The PMIP network node device 1600 may include a processing circuit 1604 coupled to a network communication interface 1606. The processing circuit 1604 may be adapted to: (a) provide wireless network connectivity to an authentication peer via a first network access node; (b) provide a PMIP key to both ends of a PMIP tunnel between the first network access node and the PMIP network node used to provide communications to the authentication peer; (c) provide the PMIP key to a first authenticator associated the first network access node; (d) receive a request from a requesting entity to reroute communications for the authentication peer; (e) verify whether the requesting entity knows the PMIP key; (0 reroute communications to a second network access node if the requesting entity successfully proves that it knows the PMIP key; and/or (g) reroute communications to a second network gateway node if the requesting entity successfully proves that it knows the PMIP key. Rerouting communications may include establishing a new proxy mobile IP tunnel between the first PMIP network node and a new serving network entity.

Consequently, a PMIP network node device may also be provided, comprising: (a) means for providing wireless network connectivity to an authentication peer via a first network access node; (b) means for providing a PMIP key to both ends of a PMIP tunnel between the first network access node and the PMIP network node used to provide communications to the authentication peer; (c) means for providing the PMIP key to a first authenticator associated the first network access node; receive a request from a requesting entity to reroute communications for the authentication peer; (d) means for verifying whether a requesting entity knows the PMIP key; (e) means for rerouting communications to a second network access node if the requesting entity successfully proves that it knows the PMIP key; and/or (f) means for rerouting communications to a second network gateway node if the requesting entity successfully proves that it knows the PMIP key. Rerouting communications may include establishing a new proxy mobile IP tunnel between the first PMIP network node and a new serving network entity.

Similarly, a computer program operational on a PMIP network node device may also be provided, which when executed by a processor causes the processor to: (a) provide wireless network connectivity to an authentication peer via a first network access node; (b) provide a PMIP key to both ends of a PMIP tunnel between the first network access node and the PMIP network node used to provide communications to the authentication peer; (c) provide the PMIP key to a first authenticator associated the first network access node; (d) receive a request from a requesting entity to reroute communications for the authentication peer; (e) verify whether the requesting entity knows the PMIP key; (f) reroute communications to a second network access node if the requesting entity successfully proves that it knows the PMIP key; and/or (g) reroute communications to a second network gateway node if the requesting entity successfully proves that it knows the PMIP key.

One or more of the components, steps, and/or functions illustrated in FIGS. 1, 2, 3, 4, 5, 6, 7, 8, 9, 10, 11, 12, 13, 15 and/or 16 may be rearranged and/or combined into a single component, step, or function or embodied in several components, steps, or functions. Additional elements, components, steps, and/or functions may also be added. The apparatus, devices, and/or components illustrated in FIGS. 1, 4, 14, 15 and 16 may be configured or adapted to perform one or more of the methods, features, or steps described in FIGS. 2, 3, and/or 5-13. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a communication network, comprising:
   authenticating, by an authentication server, an authentication peer seeking to establish communications via a first network access node;
   retrieving, by the authentication server, user profile information associated with the authentication peer, wherein the user profile information includes a quality of service for communication services of the authentication peer; and
   sending the user profile information to a network gateway node that facilitates communication services for the authentication peer.

2. The method of claim 1, further comprising:
   sending the user profile information to an authenticator that facilitates communications for the authentication peer.

3. The method of claim 1, wherein the authentication server is an authentication, authorization, and accounting (AAA) entity that is part of the communication network.

4. The method of claim 1, wherein sending the user profile information to the network gateway node includes having an authenticator for the communication network send the user profile information to the network gateway node.

5. The method of claim 1, wherein sending the user profile information to the network gateway node includes having the authentication server send the user profile information to the network gateway node.

6. The method of claim 1, further comprising:
   sending a policy request from the network gateway node to a policy control and resource function (PCRF) entity;
   sending a primary user identifier request from the PCRF entity to the authentication server, wherein the primary user identifier is uniquely associated with the authentication peer;
   sending a reply from the authentication server to the PCRF entity, the reply including the requested primary user identifier;
   obtaining a user policy at the PCRF entity for the authentication peer using the primary user identifier; and
   sending the user policy from the PCRF entity to the network gateway node.

7. The method of claim 1, further comprising:
   sending a secondary user identifier to an authenticator that facilitates communications for the authentication peer, wherein:
      the authenticator is a session reference network controller (SRNC) associated with a base station serving the authentication peer in the communication network,
      the authentication peer is a wireless access terminal, and
      the secondary user identifier is associated with a primary user identifier, the primary user identifier being a network access identifier for the wireless access terminal.

8. The method of claim 1, wherein the user profile information indicates a type of service, or a service plan, or one or more service restrictions, or any combination thereof, for the authentication peer, and the method further comprises managing signal forwarding to the authentication peer based on the user profile information such that mobility of the authentication peer is transparent to a home network of the authentication peer.

9. The method of claim 1, wherein the user profile information further includes a user profile, or a user policy, or a combination thereof.

10. An authentication server including a processing circuit adapted to:
    authenticate an authentication peer seeking to establish communications via a first network access node;
    retrieve user profile information associated with the authentication peer, wherein the user profile information includes a quality of service for communication services of the authentication peer; and
    send the user profile information to a network gateway node that facilitates communication services for the authentication peer.

11. The authentication server of claim 10, wherein the processing circuit is further adapted to:
    send the user profile information to an authenticator that facilitates communications for the authentication peer.

12. The authentication server of claim 10, wherein the processing circuit is further adapted to:
    receive a primary user identifier request from a PCRF entity, wherein the primary user identifier is uniquely associated with the authentication peer; and
    send a reply to the PCRF entity, the reply including the requested primary user identifier.

13. The authentication server of claim 10, wherein the user profile information indicates a type of service, or a service plan, or one or more service restrictions, or any combination thereof, for the authentication peer, and the processing circuit is further adapted to manage signal forwarding to the authentication peer based on the user profile information such that mobility of the authentication peer is transparent to a home network of the authentication peer.

14. The authentication server of claim 10, wherein the user profile information further includes a user profile, or a user policy, or a combination thereof.

15. An authentication server comprising:
    means for authenticating an authentication peer seeking to establish communications via a first network access node;
    means for retrieving user profile information associated with the authentication peer, wherein the user profile information includes a quality of service for communication services of the authentication peer; and
    means for sending the user profile information to a network gateway node that facilitates communication services for the authentication peer.

16. The authentication server of claim 15, further comprising:
    means for sending the user profile information to an authenticator that facilitates communications for the authentication peer.

17. The authentication server of claim 15, further comprising:
means for receiving a primary user identifier request from a PCRF entity, wherein the primary user identifier is uniquely associated with the authentication peer; and
means for sending a reply to the PCRF entity, the reply including the requested primary user identifier.

18. The authentication server of claim 15, wherein the user profile information indicates a type of service, or a service plan, or one or more service restrictions, or any combination thereof, for the authentication peer, and the authentication server further comprises means for managing signal forwarding to the authentication peer based on the user profile information such that mobility of the authentication peer is transparent to a home network of the authentication peer.

19. The authentication server of claim 15, wherein the user profile information further includes a user profile, or a user policy, or a combination thereof.

20. A non-transitory, computer-readable storage medium comprising a computer program comprising instructions which when executed by a processor of an authentication server cause the processor to:
authenticate an authentication peer seeking to establish communications via a first network access node;
retrieve user profile information associated with the authentication peer, wherein the user profile information includes a quality of service for communication services of the authentication peer; and
send the user profile information to a network gateway node that facilitates communication services for the authentication peer.

21. The non-transitory, computer-readable storage medium of claim 20, wherein the instructions when executed by the processor further cause the processor to:
send the user profile information to an authenticator that facilitates communications for the authentication peer.

22. The non-transitory, computer-readable storage medium of claim 20, wherein the instructions when executed by the processor further cause the processor to:
receive a primary user identifier request from a PCRF entity, wherein the primary user identifier is uniquely associated with the authentication peer; and
send a reply to the PCRF entity, the reply including the requested primary user identifier.

23. The non-transitory, computer-readable storage medium of claim 20, wherein the user profile information indicates a type of service, or a service plan, or one or more service restrictions, or any combination thereof, for the authentication peer, and wherein the instructions further comprise instructions to cause the processor to manage signal forwarding to the authentication peer based on the user profile information such that mobility of the authentication peer is transparent to a home network of the authentication peer.

24. The non-transitory, computer-readable storage medium of claim 20, wherein the user profile information further includes a user profile, or a user policy, or a combination thereof.

* * * * *